(12) United States Patent
Ang et al.

(10) Patent No.: US 11,039,390 B2
(45) Date of Patent: *Jun. 15, 2021

(54) TECHNIQUES FOR MANAGING POWER CONSUMPTION OF A MOBILE DEVICE

(71) Applicant: QUALCOMM Incorporated, San Diego, CA (US)

(72) Inventors: Peter Pui Lok Ang, San Diego, CA (US); Tingfang Ji, San Diego, CA (US); John Edward Smee, San Diego, CA (US); Joseph Binamira Soriaga, San Diego, CA (US); Krishna Kiran Mukkavilli, San Diego, CA (US); Peter Gaal, San Diego, CA (US); Gavin Bernard Horn, La Jolla, CA (US); Alexei Yurievitch Gorokhov, San Diego, CA (US); Naga Bhushan, San Diego, CA (US); Michael Alexander Howard, Encinitas, CA (US); Joseph Patrick Burke, San Diego, CA (US); Rotem Cooper, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/551,520

(22) Filed: Aug. 26, 2019

(65) Prior Publication Data

US 2019/0380093 A1 Dec. 12, 2019

Related U.S. Application Data

(63) Continuation of application No. 15/805,634, filed on Nov. 7, 2017, now Pat. No. 10,397,865, which is a
(Continued)

(51) Int. Cl.
*H04W 52/02* (2009.01)
*H04W 28/02* (2009.01)
(Continued)

(52) U.S. Cl.
CPC ... *H04W 52/0212* (2013.01); *H04W 28/0221* (2013.01); *H04W 52/0219* (2013.01);
(Continued)

(58) Field of Classification Search
CPC ....... H04J 2203/0069; H04J 2011/0006; H04J 2203/0092; H04J 4/00; H04J 14/0221;
(Continued)

(56) References Cited

U.S. PATENT DOCUMENTS 6,801,777 B2   10/2004  Rusch
7,407,108 B1   8/2008  Euler et al.
(Continued)

FOREIGN PATENT DOCUMENTS

CA   2665178 A1   4/2008
CN   1518842 A    8/2004
(Continued)

OTHER PUBLICATIONS

European Search Report—EP18206758—Search Authority—the Hague—Dec. 11, 2018.
(Continued)

*Primary Examiner* — Dady Chery
(74) *Attorney, Agent, or Firm* — Qualcomm IP Dept.; James Hunt Yancey, Jr.

(57) ABSTRACT

Systems, methods, apparatuses, and computer-readable storage media for managing power consumption of a mobile device are disclosed. The systems, method, apparatus, and computer-readable storage medium may cause the base station to identify an energy metric associated with a mobile device, and to configure the transmission between the base
(Continued)

station and the mobile device based at least in part on the energy metric. The configuration of the transmission may reduce the power consumption of the mobile device for processing the transmission.

17 Claims, 8 Drawing Sheets

Related U.S. Application Data continuation of application No. 14/636,734, filed on Mar. 3, 2015, now Pat. No. 9,820,225.

(60) Provisional application No. 61/992,862, filed on May 13, 2014.

(51) Int. Cl.
*H04W 52/24* (2009.01)
*H04W 52/26* (2009.01)

(52) U.S. Cl.
CPC ... *H04W 52/0229* (2013.01); *H04W 52/0261* (2013.01); *H04W 52/241* (2013.01); *H04W 52/243* (2013.01); *H04W 52/262* (2013.01); *H04W 52/265* (2013.01); *Y02D 30/70* (2020.08)

(58) Field of Classification Search
CPC .. H04B 7/2615; H04B 10/293; H04B 10/294; H04B 10/296; H04B 10/564; H04B 7/00; H04L 5/26; H04W 52/46
See application file for complete search history.

(56) References Cited

U.S. PATENT DOCUMENTS

| | | |
|---|---|---|
| 7,480,521 B2 | 1/2009 | Abdel-Kader et al. |
| 8,036,192 B2 | 10/2011 | Yaqub et al. |
| 8,270,972 B2 | 9/2012 | Otting |
| 8,311,543 B2 | 11/2012 | Dravida |
| 8,346,315 B2 | 1/2013 | Lindoff et al. |
| 8,467,305 B2 | 6/2013 | Erceg et al. |
| 8,543,659 B2 | 9/2013 | Pica et al. |
| 9,398,544 B2 | 7/2016 | Luo et al. |
| 9,820,225 B2 | 11/2017 | Ang et al. |
| 10,397,865 B2 | 8/2019 | Ang et al. |
| 2004/0082328 A1 | 4/2004 | Japenga et al. |
| 2004/0203893 A1 | 10/2004 | Kotzin |
| 2005/0114721 A1 | 5/2005 | Azadet et al. |
| 2005/0239497 A1 | 10/2005 | Bahl et al. |
| 2006/0079268 A1 | 4/2006 | Livet et al. |
| 2007/0160007 A1 | 7/2007 | Wang |
| 2007/0224990 A1 | 9/2007 | Edge et al. |
| 2007/0255797 A1 | 11/2007 | Dunn et al. |
| 2008/0070556 A1 | 3/2008 | Bhattacharjee et al. |
| 2008/0080457 A1 | 4/2008 | Cole |
| 2008/0151797 A1 | 6/2008 | Camp et al. |
| 2008/0192666 A1 | 8/2008 | Koskan et al. |
| 2008/0232574 A1 | 9/2008 | Baluja et al. |
| 2009/0082017 A1 | 3/2009 | Chang et al. |
| 2009/0131014 A1 | 5/2009 | Mashinsky et al. |
| 2010/0091691 A1 | 4/2010 | Dorsey et al. |
| 2010/0302980 A1 | 12/2010 | Ji et al. |
| 2013/0013763 A1 | 1/2013 | Chen et al. |
| 2013/0044681 A1 | 2/2013 | Abraham et al. |
| 2014/0086182 A1 | 3/2014 | Shin et al. |
| 2014/0228024 A1 | 8/2014 | Brisebois et al. |
| 2015/0312074 A1 | 10/2015 | Zhu et al. |

FOREIGN PATENT DOCUMENTS

| | | |
|---|---|---|
| CN | 1630363 A | 6/2005 |
| CN | 103748815 A | 4/2014 |
| EP | 1536569 A1 | 6/2005 |
| EP | 2334121 A2 | 6/2011 |
| JP | 2002112347 A | 4/2002 |
| JP | 2003143654 A | 5/2003 |
| JP | 2004274741 A | 9/2004 |
| JP | 2005328520 A | 11/2005 |
| JP | 2009088620 A | 4/2009 |
| JP | 2009170981 A | 7/2009 |
| JP | 2011125022 A | 6/2011 |
| JP | 2011233980 A | 11/2011 |
| JP | 2012528511 A | 11/2012 |
| JP | 2013527645 A | 6/2013 |
| JP | 2013243494 A | 12/2013 |
| KR | 20120103747 A | 9/2012 |
| TW | 201404214 A | 1/2014 |
| TW | 201412161 A | 3/2014 |
| WO | WO-2005039112 A1 | 4/2005 |
| WO | WO-2008042187 A3 | 12/2008 |
| WO | WO-2011109375 | 9/2011 |
| WO | WO-2012061685 | 5/2012 |

OTHER PUBLICATIONS

Article 34 Amendment, PCT/US2015/025443, filed Nov. 19, 2015, 24 pages.
International Search Report and Written Opinion—PCT/US2015/025443—ISA/EPO—dated Jun. 29, 2015.
Taiwan Search Report—TW104111815—TIPO—dated Feb. 26, 2018.

TECHNIQUES FOR MANAGING POWER CONSUMPTION OF A MOBILE DEVICE

CROSS-REFERENCE TO RELATED APPLICATIONS

The present application is a continuation of U.S. patent application Ser. No. 15/805,634, entitled "TECHNIQUES FOR MANAGING POWER CONSUMPTION OF A MOBILE DEVICE," filed on Nov. 7, 2017; which is a continuation of U.S. patent application Ser. No. 14/636,734, entitled "TECHNIQUES FOR MANAGING POWER CONSUMPTION OF A MOBILE DEVICE," filed on Mar. 3, 2015, and issued on Nov. 14, 2017, as U.S. Pat. No. 9,820,225; which claims priority to U.S. Provisional Patent Application No. 61/992,862, entitled "TECHNIQUES FOR MANAGING POWER CONSUMPTION OF A MOBILE DEVICE," filed on May 13, 2014, the contents of which are incorporated herein by reference in their entirety.

BACKGROUND

Field

Aspects of the present disclosure relate generally to wireless communication systems, and more particularly, to techniques for managing power consumption of a mobile device.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

SUMMARY

Aspects of the present disclosure relate to techniques for managing power consumption of a mobile device. For example, systems, methods, apparatuses, and computer-readable storage media for managing power consumption of a mobile device in communication with a base station are described herein. In an aspect, a method for managing power consumption at a mobile device for processing transmissions between a base station and the mobile device may include identifying an energy metric associated with a mobile device. The mobile device may include at least one of a mobile phone, a vehicle, a tablet, a computer, or a machine. In an aspect, the energy metric may be determined based at least in part on information stored at a database accessible to the base station. In an aspect, the energy metric associated with the mobile device may include one or more parameters associated with the transmission between the base station and the mobile device. The one or more parameters may include at least one parameter that affects an amount of energy consumed by the mobile device for processing the transmission between the base station and the mobile device. In an additional or alternative aspect, the energy metric associated with the mobile device may be a metric associated with one or more services provided by the mobile device.

In an aspect, the method may include configuring the transmission between the base station and the mobile device based at least in part on the energy metric. The configuration of the transmission may facilitate a management of the power consumption of the mobile device. In an aspect, configuring the transmission between the base station and the mobile device may include determining a modulation and coding scheme (MCS) to be used for the transmission between the base station and the mobile device. In an aspect, the method may include determining a quality of service (QoS) associated with the transmission between the base station and the mobile device, where the transmission between the base station and the mobile device is configured based, at least in part, on the determined QoS. In an aspect, the method may include periodically determining whether to modify a configuration of a subsequent transmission between the base station and the mobile device based at least in part on the energy metric.

In an aspect, the method may include identifying a capability of the mobile device, and the energy metric may be determined based, at least in part, on the capability of the mobile device. The capability of the mobile device may include at least one of one or more transmission modes (TMs) supported by the mobile device, one or more modulation and coding schemes (MCS) supported by the mobile device, one or more carrier aggregation (CA) schemes supported by the mobile device, bandwidth capabilities of the mobile device, a frame structure supported by the mobile device, a category of the mobile device, interference management techniques supported by the device, one or more duplex modes supported by the mobile device, or a combination thereof. In an aspect, the method may include receiving, from the mobile device, a message indicating the capability of the mobile device. In an additional or alternative aspect, the method may include determining an available network resource, and the energy metric may be determined based at least in part on the available network resource.

In an aspect, the method may include identifying one or more semi-dynamic parameters and one or more dynamic parameters, and determining the configuration of the transmission based on the one or more semi-dynamic parameters, the one or more dynamic parameters, and the energy metric. In an aspect, the method may include determining whether the one or more semi-dynamic parameters impose constraints on the one or more dynamic parameters, and determining the one or more dynamic parameters for configuring the transmission based on whether the one or more semi-dynamic parameters impose constraints on the one or more dynamic parameters. In an aspect, the method may include identifying one or more modulation and coding schemes (MCS) available for configuring the transmission, and iteratively evaluating the one or more available MCSs to identify a MCS that provides a reduced energy consumption by the mobile device for the transmission. The energy consumption may be determined based at least in part on the energy metric. In an aspect, the one or more dynamic parameters may include an MCS to be used for the transmission, a resource block assignment to be used for the transmission, a transport block size to be used for the transmission, a coding rate to be used for the transmission, availability of network resources, channel information, or a combination thereof, and wherein the semi-dynamic parameters include a transmission mode, a quality of service associated with the transmission, a capability of the mobile device, cell loading information, service information associated with the mobile device, a target signal to noise plus interference (SINR) for the transmission, a threshold block level error rate (BLER) for the transmission, or a combination thereof. In an aspect, configuring the transmission between the base station and the mobile device may include scheduling the transmission using a number of resource blocks. The number of resource blocks scheduled for the transmission may be determined based at least in part on the energy metric. In an additional or alternative aspect, configuring the transmission between the base station and the mobile device may include determining a transport block size to be used for the transmission between the base station and the mobile device, where the transport block size may be determined based at least in part on the energy metric.

In an aspect, the method may include determining a first energy consumption for the transmission between the base station and the mobile device based at least in part on the energy metric, determining a second energy consumption for a transmission between the base station and the mobile device independent of the energy metric, and determining a difference between the first energy consumption and the second energy consumption. In an aspect, the transmission between the base station and the mobile device may be configured based at least in part on the energy metric when the difference between the first energy consumption and the second energy consumption satisfies a threshold, and may be configured independent of the energy metric when the difference between the first energy consumption and the second energy consumption does not satisfy a threshold.

In another aspect, an apparatus for managing power consumption at a mobile device for processing transmissions between a base station and the mobile device may include a processor and a memory that is accessible to the processor. The memory may store instructions that, when executed by the processor, cause the processor to perform various operations. The operations may include may include identifying an energy metric associated with the mobile device. The mobile device may include at least one of a mobile phone, a vehicle, a tablet, a computer, or a machine. In an aspect, the energy metric may be determined based at least in part on information stored at a database accessible to the base station. In an aspect, the energy metric associated with the mobile device may include one or more parameters associated with the transmission between the base station and the mobile device. The one or more parameters may include at least one parameter that affects an amount of energy consumed by the mobile device for processing the transmission between the base station and the mobile device. In an additional or alternative aspect, the energy metric associated with the mobile device may be a metric associated with one or more services provided by the mobile device.

In an aspect, the operations may include configuring the transmission between the base station and the mobile device based at least in part on the energy metric. The configuration of the transmission may facilitate a management of the power consumption of the mobile device. In an aspect, configuring the transmission between the base station and the mobile device may include determining a modulation and coding scheme (MCS) to be used for the transmission between the base station and the mobile device. In an aspect, the operations may include determining a quality of service (QoS) associated with the transmission between the base station and the mobile device, where the transmission between the base station and the mobile device is configured based, at least in part, on the determined QoS. In an aspect, the operations may include periodically determining whether to modify a configuration of a subsequent transmission between the base station and the mobile device based at least in part on the energy metric.

In an aspect, the operations may include identifying a capability of the mobile device, and the energy metric may be determined based, at least in part, on the capability of the mobile device. The capability of the mobile device may include at least one of one or more transmission modes (TMs) supported by the mobile device, one or more modulation and coding schemes (MCS) supported by the mobile device, one or more carrier aggregation (CA) schemes supported by the mobile device, bandwidth capabilities of the mobile device, a frame structure supported by the mobile device, a category of the mobile device, interference management techniques supported by the device, one or more duplex modes supported by the mobile device, or a combination thereof. In an aspect, the operations may include receiving, from the mobile device, a message indicating the capability of the mobile device. In an additional or alternative aspect, the operations may include determining an available network resource, and the energy metric may be determined based at least in part on the available network resource.

In an aspect, the operations may include identifying one or more semi-dynamic parameters and one or more dynamic parameters, and determining the configuration of the transmission based on the one or more semi-dynamic parameters, the one or more dynamic parameters, and the energy metric. In an aspect, the operations may include determining whether the one or more semi-dynamic parameters impose constraints on the one or more dynamic parameters, and determining the one or more dynamic parameters for configuring the transmission based on whether the one or more semi-dynamic parameters impose constraints on the one or more dynamic parameters. In an aspect, the operations may include identifying one or more modulation and coding schemes (MCS) available for configuring the transmission, and iteratively evaluating the one or more available MCSs to identify a MCS that provides a reduced energy consumption by the mobile device for the transmission. The energy consumption may be determined based at least in part on the energy metric. In an aspect, the one or more dynamic parameters may include an MCS to be used for the transmission, a resource block assignment to be used for the transmission, a transport block size to be used for the transmission, a coding rate to be used for the transmission, availability of network resources, channel information, or a combination thereof, and wherein the semi-dynamic parameters include a transmission mode, a quality of service associated with the transmission, a capability of the mobile device, cell loading information, service information associated with the mobile device, a target signal to noise plus interference (SINR) for the transmission, a threshold block level error rate (BLER) for the transmission, or a combination thereof. In an aspect, configuring the transmission between the base station and the mobile device may include scheduling the transmission using a number of resource blocks. The number of resource blocks scheduled for the transmission may be determined based at least in part on the energy metric. In an additional or alternative aspect, configuring the transmission between the base station and the mobile device may include determining a transport block size to be used for the transmission between the base station and the mobile device, where the transport block size may be determined based at least in part on the energy metric.

In an aspect, the operations may include determining a first energy consumption for the transmission between the base station and the mobile device based at least in part on the energy metric, determining a second energy consumption for a transmission between the base station and the mobile device independent of the energy metric, and determining a difference between the first energy consumption and the second energy consumption. In an aspect, the transmission between the base station and the mobile device may be configured based at least in part on the energy metric when the difference between the first energy consumption and the second energy consumption satisfies a threshold, and may be configured independent of the energy metric when the difference between the first energy consumption and the second energy consumption does not satisfy a threshold.

In another aspect, a non-transitory computer-readable storage medium that may store instructions for managing power consumption at a mobile device for processing transmissions between a base station and the mobile device. The instructions, when executed by a processor, may cause the processor to perform various operations that may include identifying an energy metric associated with a mobile device The mobile device may include at least one of a mobile phone, a vehicle, a tablet, a computer, or a machine. In an aspect, the energy metric may be determined based at least in part on information stored at a database accessible to the base station. In an aspect, the energy metric associated with the mobile device may include one or more parameters associated with the transmission between the base station and the mobile device. The one or more parameters may include at least one parameter that affects an amount of energy consumed by the mobile device for processing the transmission between the base station and the mobile device. In an additional or alternative aspect, the energy metric associated with the mobile device may be a metric associated with one or more services provided by the mobile device.

In an aspect, the operations may include configuring the transmission between the base station and the mobile device based at least in part on the energy metric. The configuration of the transmission may facilitate a management of the power consumption of the mobile device. In an aspect, configuring the transmission between the base station and the mobile device may include determining a modulation and coding scheme (MCS) to be used for the transmission between the base station and the mobile device. In an aspect, the operations may include determining a quality of service (QoS) associated with the transmission between the base station and the mobile device, where the transmission between the base station and the mobile device is configured based, at least in part, on the determined QoS. In an aspect, the operations may include periodically determining whether to modify a configuration of a subsequent transmission between the base station and the mobile device based at least in part on the energy metric.

In an aspect, the operations may include identifying a capability of the mobile device, and the energy metric may be determined based, at least in part, on the capability of the mobile device. The capability of the mobile device may include at least one of one or more transmission modes (TMs) supported by the mobile device, one or more modulation and coding schemes (MCS) supported by the mobile device, one or more carrier aggregation (CA) schemes supported by the mobile device, bandwidth capabilities of the mobile device, a frame structure supported by the mobile device, a category of the mobile device, interference management techniques supported by the device, one or more duplex modes supported by the mobile device, or a combination thereof. In an aspect, the operations may include receiving, from the mobile device, a message indicating the capability of the mobile device. In an additional or alternative aspect, the operations may include determining an available network resource, and the energy metric may be determined based at least in part on the available network resource.

In an aspect, the operations may include identifying one or more semi-dynamic parameters and one or more dynamic parameters, and determining the configuration of the transmission based on the one or more semi-dynamic parameters, the one or more dynamic parameters, and the energy metric. In an aspect, the operations may include determining whether the one or more semi-dynamic parameters impose constraints on the one or more dynamic parameters, and determining the one or more dynamic parameters for configuring the transmission based on whether the one or more semi-dynamic parameters impose constraints on the one or more dynamic parameters. In an aspect, the operations may include identifying one or more modulation and coding schemes (MCS) available for configuring the transmission, and iteratively evaluating the one or more available MCSs to identify a MCS that provides a reduced energy consumption by the mobile device for the transmission. The energy consumption may be determined based at least in part on the energy metric. In an aspect, the one or more dynamic parameters may include an MCS to be used for the transmission, a resource block assignment to be used for the transmission, a transport block size to be used for the transmission, a coding rate to be used for the transmission, availability of network resources, channel information, or a combination thereof, and wherein the semi-dynamic parameters include a transmission mode, a quality of service associated with the transmission, a capability of the mobile device, cell loading information, service information associated with the mobile device, a target signal to noise plus interference (SINR) for the transmission, a threshold block level error rate (BLER) for the transmission, or a combination thereof. In an aspect, configuring the transmission between the base station and the mobile device may include scheduling the transmission using a number of resource blocks. The number of resource blocks scheduled for the transmission may be determined based at least in part on the energy metric. In an additional or alternative aspect, configuring the transmission between the base station and the mobile device may include determining a transport block size to be used for the transmission between the base station and the mobile device, where the transport block size may be determined based at least in part on the energy metric.

In an aspect, the operations may include determining a first energy consumption for the transmission between the base station and the mobile device based at least in part on the energy metric, determining a second energy consumption for a transmission between the base station and the mobile device independent of the energy metric, and determining a difference between the first energy consumption and the second energy consumption. In an aspect, the transmission between the base station and the mobile device may be configured based at least in part on the energy metric when the difference between the first energy consumption and the second energy consumption satisfies a threshold, and may be configured independent of the energy metric when the difference between the first energy consumption and the second energy consumption does not satisfy a threshold.

In yet another aspect, an apparatus for managing power consumption at a mobile device for processing transmissions between a base station and the mobile device may include means for identifying an energy metric associated with the mobile device. The mobile device may include at least one of a mobile phone, a vehicle, a tablet, a computer, or a machine. In an aspect, the energy metric may be determined based at least in part on information stored at a database accessible to the base station. In an aspect, the energy metric associated with the mobile device may include one or more parameters associated with the transmission between the base station and the mobile device. The one or more parameters may include at least one parameter that affects an amount of energy consumed by the mobile device for processing the transmission between the base station and the mobile device. In an additional or alternative aspect, the energy metric associated with the mobile device may be a metric associated with one or more services provided by the mobile device.

In an aspect, the apparatus may include means for configuring the transmission between the base station and the mobile device based at least in part on the energy metric. The configuration of the transmission may facilitate a management of the power consumption of the mobile device. In an aspect, the means for configuring the transmission between the base station and the mobile device may include means determining a modulation and coding scheme (MCS) to be used for the transmission between the base station and the mobile device. In an aspect, the apparatus may include means for determining a quality of service (QoS) associated with the transmission between the base station and the mobile device, where the transmission between the base station and the mobile device is configured based, at least in part, on the determined QoS. In an aspect, the apparatus may include means for periodically determining whether to modify a configuration of a subsequent transmission between the base station and the mobile device based at least in part on the energy metric.

In an aspect, the apparatus may include means for identifying a capability of the mobile device, and the energy metric may be determined based, at least in part, on the capability of the mobile device. The capability of the mobile device may include at least one of one or more transmission modes (TMs) supported by the mobile device, one or more modulation and coding schemes (MCS) supported by the mobile device, one or more carrier aggregation (CA) schemes supported by the mobile device, bandwidth capabilities of the mobile device, a frame structure supported by the mobile device, a category of the mobile device, interference management techniques supported by the device, one or more duplex modes supported by the mobile device, or a combination thereof. In an aspect, the apparatus may include means for receiving, from the mobile device, a message indicating the capability of the mobile device. In an additional or alternative aspect, the apparatus may include means for determining an available network resource, and the energy metric may be determined based at least in part on the available network resource.

In an aspect, the apparatus may include means for identifying one or more semi-dynamic parameters and one or more dynamic parameters, and determining the configuration of the transmission based on the one or more semi-dynamic parameters, the one or more dynamic parameters, and the energy metric. In an aspect, the apparatus may include means for determining whether the one or more semi-dynamic parameters impose constraints on the one or more dynamic parameters, and means for determining the one or more dynamic parameters for configuring the transmission based on whether the one or more semi-dynamic parameters impose constraints on the one or more dynamic parameters. In an aspect, the apparatus may include means for identifying one or more modulation and coding schemes (MCS) available for configuring the transmission, and iteratively evaluating the one or more available MCSs to identify a MCS that provides a reduced energy consumption by the mobile device for the transmission. The energy consumption may be determined based at least in part on the energy metric. In an aspect, the one or more dynamic parameters may include an MCS to be used for the transmission, a resource block assignment to be used for the transmission, a transport block size to be used for the transmission, a coding rate to be used for the transmission, availability of network resources, channel information, or a combination thereof, and wherein the semi-dynamic parameters include a transmission mode, a quality of service associated with the transmission, a capability of the mobile device, cell loading information, service information associated with the mobile device, a target signal to noise plus interference (SINR) for the transmission, a threshold block level error rate (BLER) for the transmission, or a combination thereof. In an aspect, the means for configuring the transmission between the base station and the mobile device may include means for scheduling the transmission using a number of resource blocks. The number of resource blocks scheduled for the transmission may be determined based at least in part on the energy metric. In an additional or alternative aspect, the means for configuring the transmission between the base station and the mobile device may include means for determining a transport block size to be used for the transmission between the base station and the mobile device, where the transport block size may be determined based at least in part on the energy metric.

In an aspect, the apparatus may include means for determining a first energy consumption for the transmission between the base station and the mobile device based at least in part on the energy metric, means for determining a second energy consumption for a transmission between the base station and the mobile device independent of the energy metric, and means for determining a difference between the first energy consumption and the second energy consumption. In an aspect, the transmission between the base station and the mobile device may be configured based at least in part on the energy metric when the difference between the first energy consumption and the second energy consumption satisfies a threshold, and may be configured independent of the energy metric when the difference between the first energy consumption and the second energy consumption does not satisfy a threshold.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G)) network. For clarity, certain aspects of the techniques are described below with reference to LTE terminology is used in much of the description below, however, the aspects of the present disclosure are not to be limited to LTE networks. Thus, the use of LTE terminology has been provided for simplicity, since 5G network standards have not been formalized.

Figure 1:
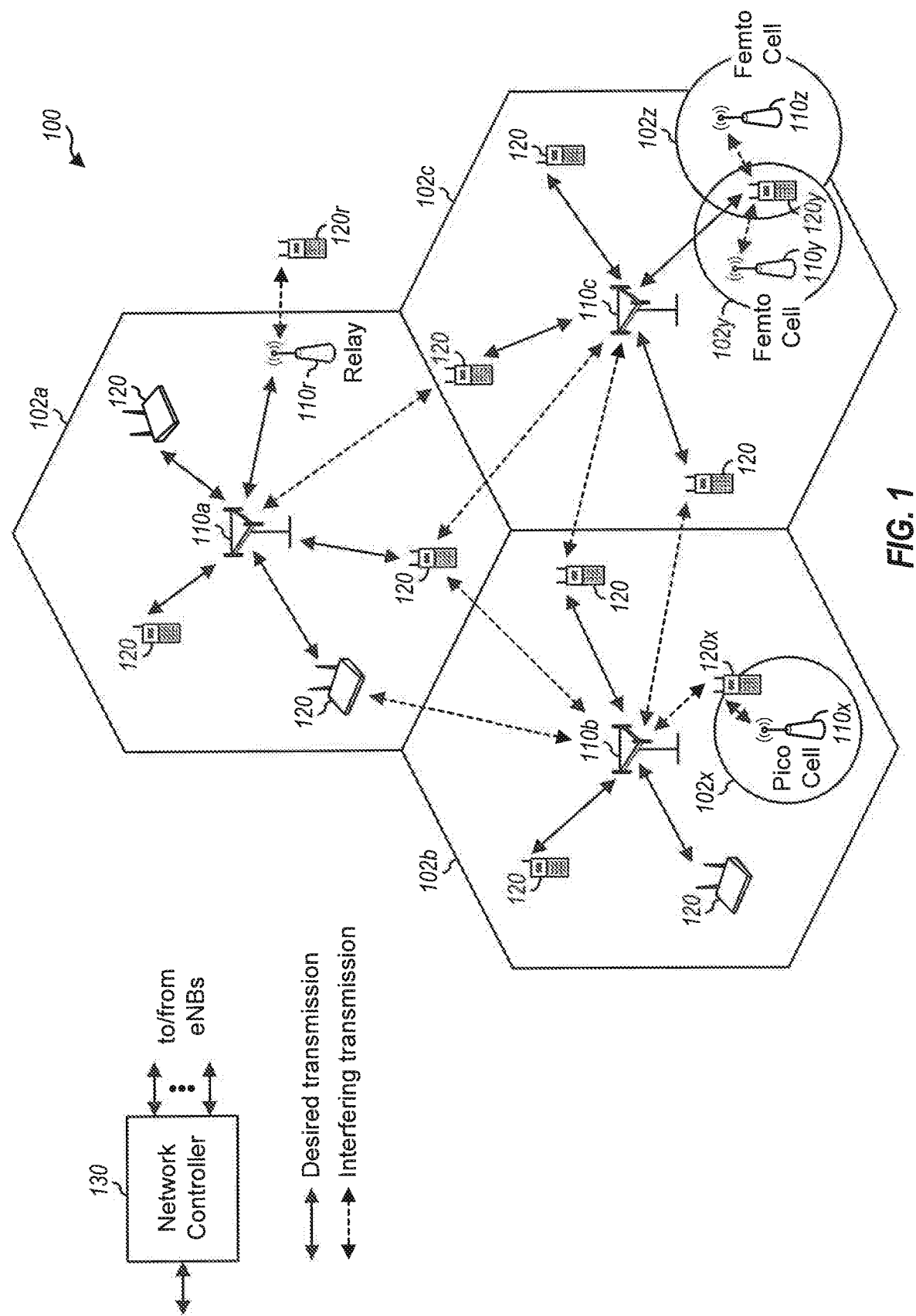
FIG. 1 is a block diagram conceptually illustrating an example of a wireless communication network, in accordance with various aspects of the present disclosure.

FIG. 1 shows a wireless communication network 100, in accordance with various aspects of the present disclosure. For example, the wireless communication network 100 may be an LTE network or a next generation (e.g., 5$^{th}$ Generation (5G)) network. The wireless network 100 may include a number of evolved Node Bs (eNodeBs) 110 and other network entities.

An eNodeB may be a station that communicates with the UEs and may also be referred to as a base station, an access point, etc. A Node B is another example of a station that communicates with the UEs.

Each eNodeB 110 may provide communication coverage for a geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

For example, the wireless communication network 100 utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. For example, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
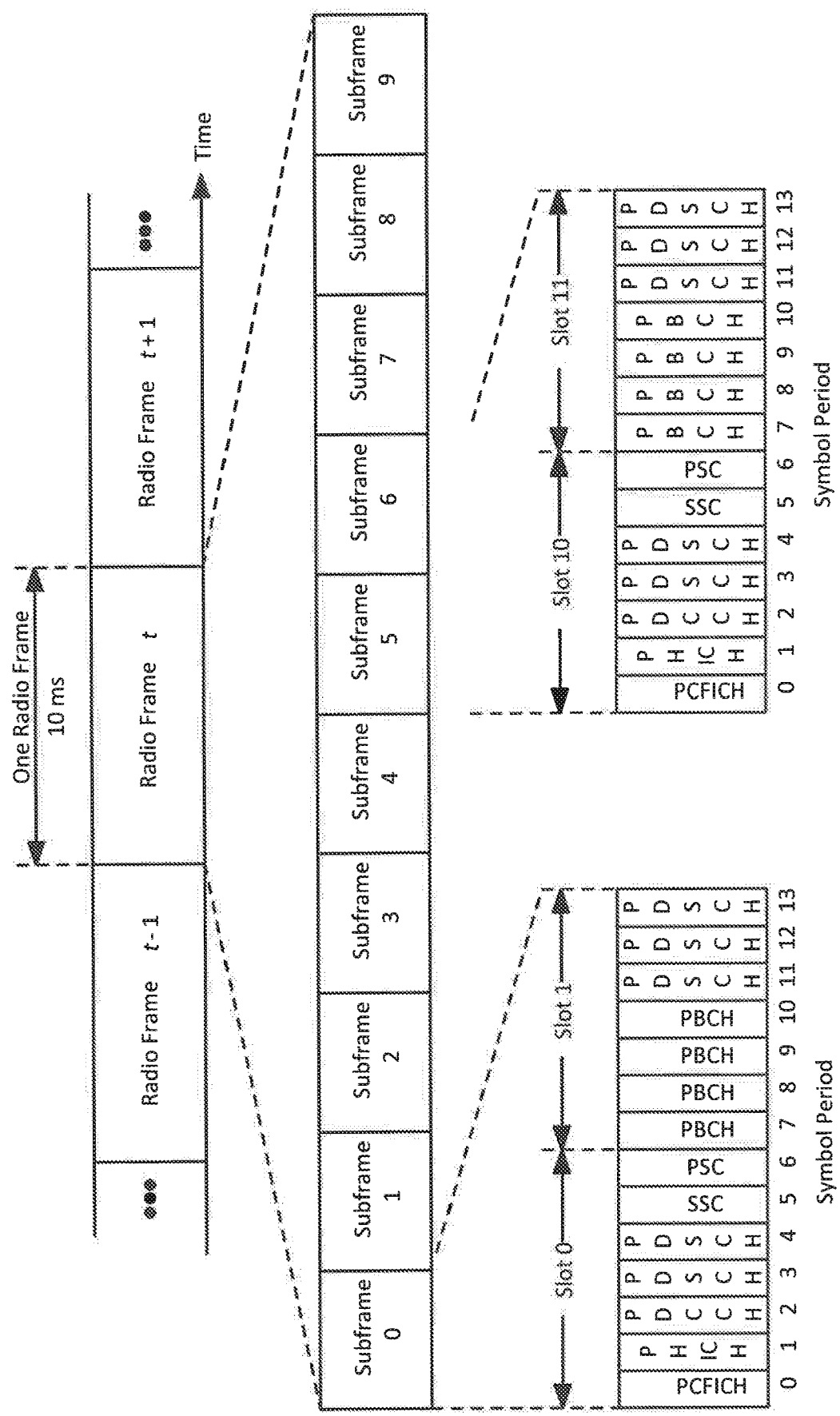
FIG. 2 is a block diagram conceptually illustrating an example of a frame structure in a wireless communication network, in accordance with various aspects of the present disclosure.

FIG. 2 shows a down link frame structure used in a wireless communication network (e.g., the wireless communication network shown in FIG. 1), in accordance with various aspects of the present disclosure. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2 L symbol periods in each subframe may be assigned indices of 0 through 2 L−1. The available time frequency resources may be partitioned into resource blocks. Each resource block may cover N subcarriers (e.g., 12 subcarriers) in one slot.

An eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period.

Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2.

The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
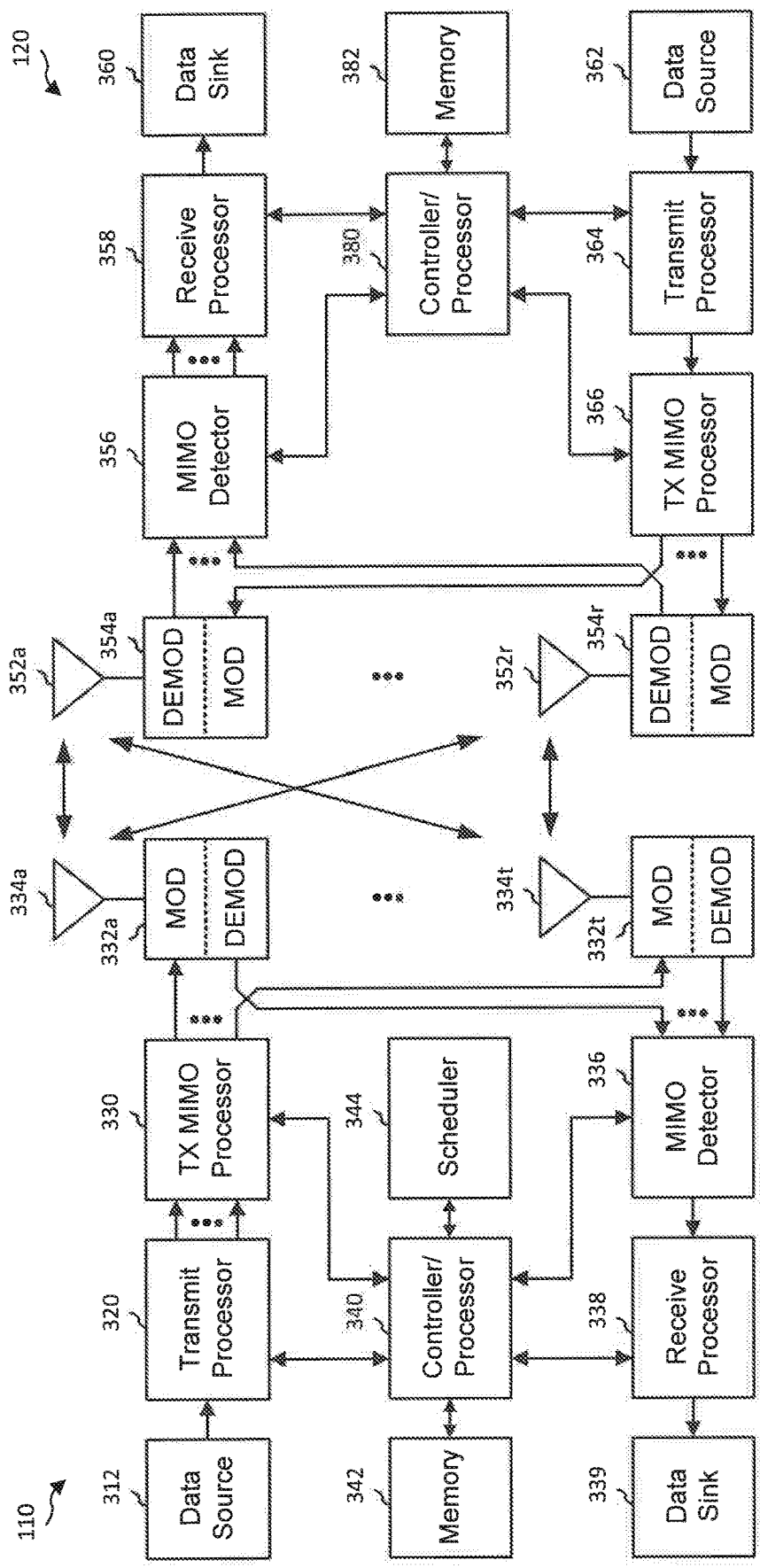
FIG. 3 is a block diagram conceptually illustrating a design of an eNodeB and a UE configured, in accordance with various aspects of the present disclosure.

FIG. 3 shows a block diagram of a design of an eNodeB 110 and a UE 120, in accordance with various aspects of the present disclosure. The eNodeB 110 and the UE 120 may be one of the eNodeBs and one of the UEs in FIG. 1. For a restricted association scenario, the eNodeB 110 may be the macro eNodeB 110c in FIG. 1, and the UE 120 may be the UE 120y. The eNodeB 110 may be equipped with antennas 334a through 334t, and the UE 120 may be equipped with antennas 352a through 352r.

At the eNodeB 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the eNodeB 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 658 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the eNodeB 110. At the eNodeB 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNodeB 110 and the UE 120, respectively. The processor 340 and/or other processors and modules at the eNodeB 110 may perform or direct the execution of various processes for the techniques described herein. The memories 342 and 382 may store data and program codes for the eNodeB 110 and the UE 120, respectively. A scheduler 344 may schedule UEs for data transmission on the downlink and/or uplink.

In one configuration, the UE 120 for wireless communication includes means for detecting interference from an interfering eNodeB during a connection mode of the UE, means for selecting a yielded resource of the interfering eNodeB, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

UEs may use spectrum up to 20 MHz bandwidths allocated in a carrier aggregation of up to a total of 100 MHz (5 component carriers) used for transmission in each direction. In an example, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments will conserve spectrum and are a good fit for the typically asymmetric bandwidth utilization by broadband subscribers.

For some mobile systems, two types of carrier aggregation (CA) methods have been proposed, continuous CA and non-continuous CA. Non-continuous CA occurs when multiple available component carriers are separated along the frequency band. On the other hand, continuous CA occurs when multiple available component carriers are adjacent to each other. Both non-continuous CA and continuous CA may aggregate multiple component carriers to serve a single UE.

Multiple RF receiving units and multiple FFTs may be deployed with non-continuous CA in Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in a system where the enhanced NodeB (eNodeB) has fixed transmitting power on each component carrier, the effective coverage or supportable modulation and coding of each component carrier may be different.

In a system using medium access control (MAC) layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

For example, there are various different approaches for deploying control channel signaling for multiple component carriers. In an aspect, each component carrier is given its own coded control channel.

In another aspect the control channels of different component carriers may be jointly coded and deployed in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed using an aspect. This approach offers low signaling overhead and high decoding performance in control channels, at the expense of high power consumption at the UE side. It is preferable to support transmission continuity during the handover procedure across multiple cells when CA is used by the UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in some other systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNode B.

Figure 4:
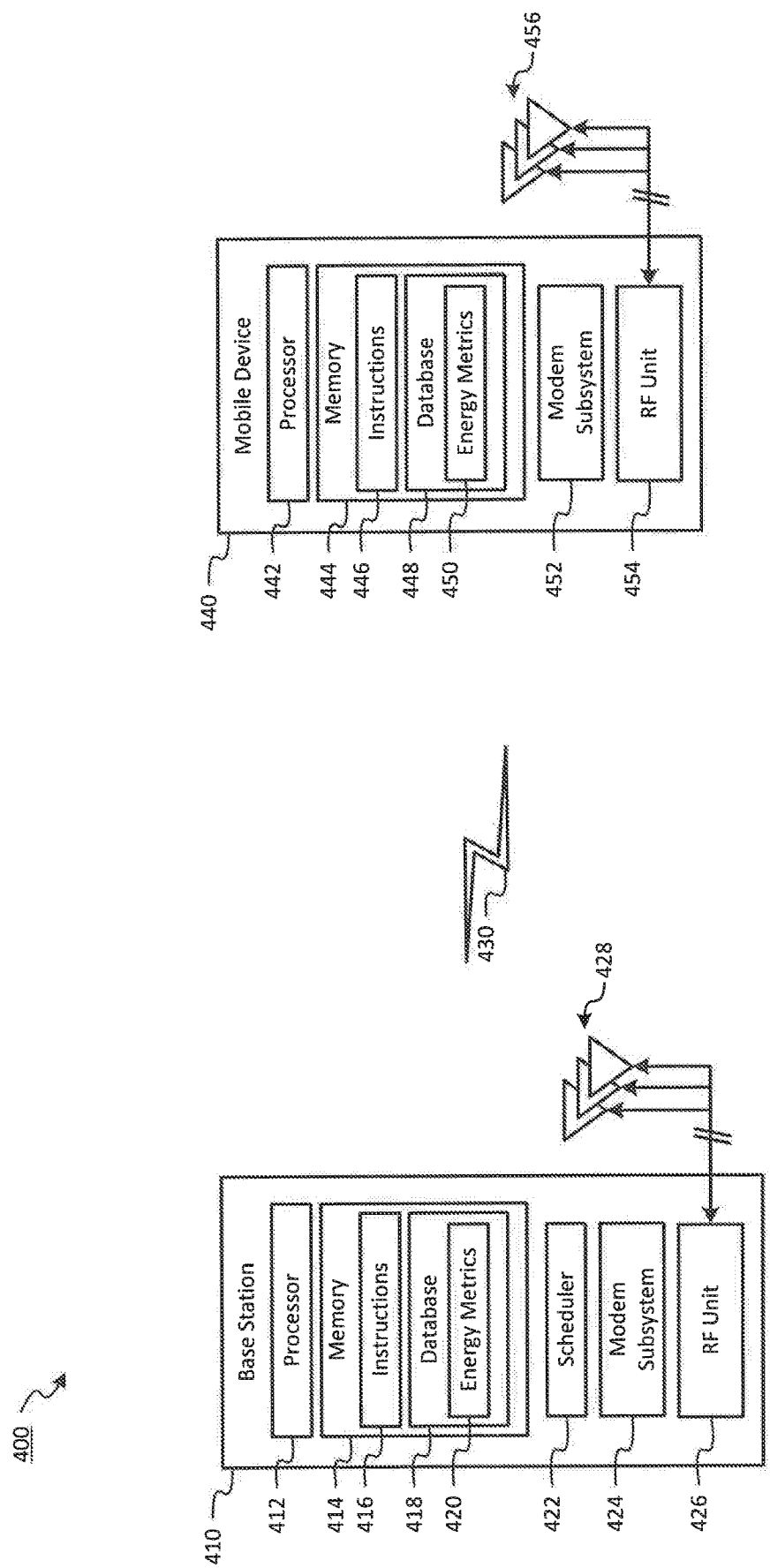
FIG. 4 is a block diagram of an exemplary system for managing power consumption at a mobile device, in accordance with various aspects of the present disclosure.

Referring to FIG. 4, a block diagram of an exemplary system for managing power consumption at a mobile device, in accordance with various aspects of the present disclosure is shown as a system 400. As shown in FIG. 4, the system 400 includes a base station 410 and a mobile device 440. The base station 410 and the mobile device 440 may be communicatively coupled via a wireless connection 430 according to one or more communication protocols (e.g., a $3^{rd}$ Generation (3G) protocol, an 802.11 protocol, an 802.15 protocol, $4^{th}$ Generation (4G)/long term evolution (LTE) protocol, a $5^{th}$ Generation (5G) protocol, etc.).

The system 400 may be configured to improve the energy efficiency of the mobile device 440. For example, data rates provided by communication networks (e.g., 3G communication networks, 4G/LTE communication networks, 802.11 networks, 802.15 networks, etc.) have increased over time, thereby allowing data to be transferred between the base station 410 and the mobile device 440 more quickly. With the improvements to data rates, use of mobile devices for some services, such as streaming video services, has become more widespread. However, the improvements to the data rates also increased power consumption of the mobile devices. Additionally, presently available communication systems do not consider power consumption of mobile devices (e.g., modem power consumption) when configuring transmissions. Mobile devices operating within the system 400 according to aspects of the present disclosure may realize reduced power consumption and improved energy efficiency over existing communication systems.

For example, in the system 400, the base station 410 may be configured to use energy metrics information to optimize transmissions to the mobile device 440, where the transmission are optimized to reduce the power consumption by the mobile device 440 for receiving and/or processing the transmissions. In an aspect, optimizing the transmissions may include selecting a modulation and coding scheme (MCS) that is predicted to reduce the power consumption of the mobile device 440, selecting a coding rate for the transmissions that is predicted to reduce the power consumption of the mobile device 440, selecting a carrier aggregation (CA) scheme that is predicted to reduce the power consumption of the mobile device 440, selecting a duplex mode that is predicted to reduce the power consumption of the mobile device 440, selecting a transmission mode that is predicted to reduce the power consumption of the mobile device 440, configuring a hybrid automatic repeat request (HARQ) parameter that is predicted to reduce the power consumption of the mobile device 440, selecting a resource block configuration that is predicted to reduce the power consumption of the mobile device 440, selecting an interference management technique that is predicted to reduce the power consumption of the mobile device 440, or a combination thereof, as described in more detail below. The base station 410 may also consider other energy metrics information, parameters, and factors that affect the energy consumption of the mobile device 440 when configuring a transmission between the base station 410 and the mobile device 440. Thus, one or more aspects of the system 400 may reduce the power consumption of the mobile device 440. Additional aspects and advantages of the system 400 are described in more detail below.

The mobile device 440 may be a user equipment (UE) that may include a mobile communication device (e.g., a smartphone, a cellular telephone, a personal digital assistant, etc.), a tablet computing device, a laptop computing device, a vehicle, a gaming console, a machine, a personal computing device, an e-reader device, a sensor device, another electronic device, or a combination of these devices that is operable to perform the operations described herein with respect to the mobile device 440. The mobile device 440 may include a processor 442, a memory 444, a modem subsystem 452, a radio frequency (RF) unit 454, and antenna elements 456. The RF unit 456 may be configured to process (e.g., perform analog to digital conversion, power amplification, etc.) transmissions received via the antenna elements 456 (e.g., transmissions between the base station 410 and the mobile device 440), and the modem subsystem 452 may be configured to demodulate and/or decode the transmissions. Additionally, the modem subsystem 452, the RF unit 456, and the antenna elements 456 may also be used for transmissions originating from the mobile device 440 (e.g., uplink transmissions). The processor 442 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein with reference to the mobile device 440 in connection with FIGS. 4-8.

The memory 444 may include a cache memory (e.g., a cache memory of the processor 442), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. The memory 444 may store instructions 446 and a database 448. The instructions 446 may include instructions that, when executed by the processor 442, cause the processor 442 to perform the operations described herein with reference to the mobile device 440 in connection with FIGS. 1-8.

The database 448 may include energy metrics information 450 that may include information associated with one or more parameters that may be used to configure a transmission between the base station 410 and the mobile device 440. The one or more parameters may include at least one parameter that affects an amount of energy consumed by the mobile device 440 for processing the transmission between the base station 410 and the mobile device 440. For example, various functions that the mobile device 440 may support include decoding of transmissions using one or more modulation and coding schemes (MCSs) (e.g., a low-density parity check (LDPC) coding scheme, a turbo coding scheme, a convolutional coding scheme, etc.), one or more transmission modes (e.g., single layer transmissions, multilayer transmissions, single user multiple-input multiple-output (SU-MIMO), multi-user multiple-input multiple-output (MU-MIMO), transmit diversity, beamforming, etc.), one or more carrier aggregation (CA) schemes, one or more duplex modes (e.g., time division duplexing (TDD) and/or frequency division duplexing (FDD)), one or more UE categories, one or more interference management techniques (e.g., enhanced inter-cell interference coordination (eICIC), network assisted interference cancellation (NAIC), etc.), one or more frame structures, other functions supported by the mobile device 440, or a combination thereof. Each of the various functions supported by the mobile device 440 may be associated with one or more energy metrics that may indicate a power consumption of the mobile device for a transmission configuration, and the energy metrics information 450 may be used by the base station 410 to configure the transmission between the base station 410 and the mobile device 440 based on a predicted amount of energy consumed by the mobile device 440 for processing a transmission having the configuration. The amount of energy consumed by the mobile device 440 for a transmission may vary based on the parameters selected by the base station 410 for configuring the transmission between the base station 410 and the mobile device 440. In an aspect, the energy metrics information 450 may include all or some of the types of information described in connection with the energy metrics information 420 below.

However, the energy metrics information 450 may be configured for the mobile device 440, whereas the energy metrics information 420 may be associated with multiple difference types and/or configurations of mobile devices.

The base station 410 may be an evolved Node B (eNodeB) (e.g., one of the eNodeBs 110 of FIG. 1), a macro cell (e.g., one of the macro cells 102a, 102b, 102c of FIG. 1), a pico cell (e.g., the pico cell 102x of FIG. 1), a femto cell (e.g., one of the femto cells 102y, 102z of FIG. 1), a relay station (e.g., the relay 110r of FIG. 1), an access point, or another electronic device operable to perform the operations described herein with respect to the base station 410 with reference to FIGS. 1-8. The base station 410 may operate in accordance with one or more communication standards, such as a 3rd generation (3G) wireless communication standard, a 4G/long term evolution (LTE) wireless communication standard, an LTE-advanced wireless communication standard, a $5^{th}$ Generation (5G) wireless communication standard, or another wireless communication standard now known or later developed (e.g., a next generation network operating protocol).

As shown in FIG. 4, the base station 410 may include a processor 412, a memory 414, a scheduler 422, a modem subsystem 424, a radio frequency (RF) unit 426, and antenna elements 428. The processor 412 may include a CPU, a DSP, an ASIC, a controller, a FPGA device, another hardware device, a firmware device, or any combination thereof configured to perform the operations described herein with reference to the base station 410 in connection with FIGS. 1-8. The RF unit 426 may be configured to process (e.g., perform digital to analog conversion, power amplification, etc.) of transmissions originating from the base station 410 that may be transmitted via the antenna elements 428 (e.g., transmissions between the base station 410 and the mobile device 440) and the modem subsystem 424 may be configured to modulate and/or encode the transmissions according to a modulation and coding scheme (MCS), as described in more detail below. Additionally, the modem subsystem 424, the RF unit 426, and the antenna elements 428 may also be used for receiving transmissions originating from the mobile device 440 (e.g., uplink transmissions).

The memory 414 may include a cache memory (e.g., a cache memory of the processor 412), RAM, MRAM, ROM, PROM, EPROM, EEPROM, flash memory, a solid state memory device, one or more hard disk drives, other forms of volatile and non-volatile memory, or a combination of different types of memory. As shown in FIG. 4, the memory 414 may store instructions 416. The instructions 416 may include instructions that, when executed by the processor 412, cause the processor 412 to perform operations for configuring transmissions based on energy metrics, as described in connection with FIGS. 1-8 of the present disclosure.

In an aspect, the memory 414 may store a database 418. In an additional or alternative aspect, the database 418 may be stored external to the base station 410. For example, the database 418 may be stored at memory device accessible to the base station 410 via a network (not shown in FIG. 4), such as a backhaul network of a wireless communication system in which the base station 410 is operating. As another example, the base station 410 may be a pico cell (e.g., the pico cell 102x of FIG. 1) or a femto cell (e.g., one of the femto cells 102y, 102z of FIG. 1) operating within a coverage area provided by a macro cell (e.g., the macro cell 102b or the macro cell 102c, respectively), and the database 418 may be stored at a memory of the macro cell. In this example, the database 418 may be accessible via a connection (e.g., a wired or wireless connection) between the base station 410 and the macro cell.

The database 418, whether stored at the memory 414 or at another location accessible to the base station 410, may store energy metrics information 420. The energy metric information 420 may include information associated with the mobile device 440 and/or other mobile devices (not shown in FIG. 4). The energy metrics information 420 may include information associated with one or more parameters that may be used to configure a transmission between the base station 410 and the mobile device 440. The one or more parameters may include at least one parameter that may affect an amount of energy consumed by the mobile device 440 for processing the transmission between the base station 410 and the mobile device 440. In an aspect, the energy metrics information 420 may be configured for each different mobile device 440 (e.g., per SKU of the mobile device 440). In an aspect, the one or more parameters may be associated with various functions supported by the mobile device 440, and may indicate, for each of the various functions, one or more configurations and corresponding energy consumption information for the mobile device 440. For example, the various functions that the mobile device 440 may support include decoding of transmissions using one or more modulation and coding schemes (MCSs) (e.g., a low-density parity check (LDPC) coding scheme, a turbo coding scheme, a convolutional coding scheme, etc.), one or more transmission modes (e.g., single layer transmissions, multilayer transmissions, single user multiple-input multiple-output (SU-MIMO), multi-user multiple-input multiple-output (MU-MIMO), transmit diversity, beamforming, etc.), one or more carrier aggregation (CA) schemes, one or more duplex modes (e.g., time division duplexing (TDD) and/or frequency division duplexing (FDD)), one or more UE categories, one or more interference management techniques (e.g., enhanced inter-cell interference coordination (eICIC), network assisted interference cancellation (NAIC), etc.), one or more frame structures, other functions supported by the mobile device 440, or a combination thereof. Each of these various functions of the mobile device 440 may be used by the base station 410 to configure the transmissions between the base station 410 and the mobile device 440, and the energy consumed by the mobile device 440 for processing the transmissions may vary based on the parameters selected by the base station 410 for configuring the transmissions between the base station 410 and the mobile device 440.

The one or more parameters included in the energy metrics information 420 may include information representative of an amount of energy consumed per unit of data processed (e.g., a number of Joules per bit, a number of milliwatts per megabits per second (MBPS), a number of milli amperes per MBPS, etc.), or an approximation of the amount of energy consumed per unit of data consumed by the mobile device 440 for processing the transmissions according to various transmission configurations. For example, the one or more parameters may include a parameter that may indicate a first amount of energy per unit of data processed is consumed by the mobile device 440 for transmissions configured using a first MCS (e.g., a convolutional coding scheme), and a second amount of energy per unit of data processed is consumed by the mobile device 440 for transmissions configured using a second MCS (e.g., an LDPC coding scheme), for transferring a same payload (e.g., a same amount of data). The first amount of energy consumed by the mobile device 440 per unit of data processed and the second amount of energy consumed by the mobile device 440 per unit of data processed may be different and based at least in part on different MCSs. In an example, the second amount of energy consumed by the mobile device 440 per unit of data processed may be higher than the first amount of energy consumed by the mobile device 440 per unit of data processed due to an additional decoding complexity required to decode transmissions configured using the second MCS relative to the first MCS.

As another example, the one or more parameters may include a parameter that may indicate a first amount of energy is consumed by the mobile device 440 for processing transmissions configured using a first CA scheme (e.g., using two component carriers in a 2×-CA scheme), and a second amount of energy is consumed by the mobile device 440 for processing transmissions configured using a second CA scheme (e.g., using three component carriers in a 3×-CA scheme). The first amount of energy consumed by the mobile device 440 per unit of data processed and the second amount of energy consumed by the mobile device 440 per unit of data processed may be different and based at least in part on different CA schemes. In an example, the second amount of energy may be higher than the first amount of energy due to an additional demodulation and decoding complexity required to decode transmissions configured using the second CA scheme relative to the first CA scheme.

In some instances, the one or more parameters may be configured based at least in part on the mobile device 440. For example, mobile devices 440 manufactured by different manufacturers may utilize different communication components (e.g., modulators/decoders). A first communication component of a first device manufactured by a first manufacturer may operate in a more energy efficient manner than a second communication component of a second device manufactured by a second manufacturer. Thus, energy consumption of the mobile device 440 may vary for a single function or parameter from one device manufacturer to another.

In some aspects, the parameters may include information indicating interdependencies between the functions of the mobile device 440 and the energy consumed by the mobile device 440 for processing the transmissions. For example, the frame structure may depend on whether the transmissions between the base station 410 and the mobile device 440 may be configured using the TDD duplex mode or the FDD (e.g., either full duplex FDD or half duplex FDD). As another example, a number of resource blocks allocated for the transmission between the base station 410 and the mobile device 440 may be dependent on an MCS used to configure the transmission. For example, each MCS may or may not use zero padding. When two different MCSs use zero padding, each of the two different MCSs may utilize a different number of zero padding bits. The utilization of zero padding, and the number of zero padding bits may affect the number of resource blocks allocated for the transmission (e.g., an increased number zero padding bits may cause a corresponding increase in the number of resource blocks allocated for the transmission). Additionally, the MCS may affect a size of the resource blocks, a constellation size, etc.

The energy metrics information 420 may further include information associated with different categories of mobile devices 440 (also referred to as user equipment (UE)). For example, the 3rd generation partnership project (3GPP) long term evolution (LTE) standards describe eight categories of UE. Each category of UE is associated with a plurality of physical layer parameters (e.g., uplink parameters and downlink parameters). For each category of UE, the physical layer parameters may include a maximum number of downlink shared channel (DL-SCH) transport block bits or uplink shared channel (UL-SCH) transport block bits that may be received within a transmit time interval (TTI), a maximum number of bits of a DL-SCH transport block or a UL-SCH transport block that may be received within the TTI, a total number of soft channel bits (e.g., for hybrid automatic repeat request (HARQ) processing), a maximum number of supported layers for spatial multiplexing in the downlink (DL) (e.g., per UE), whether 64 quadrature amplitude modulation (64 QAM) is supported in uplink (UL), a total layer 2 buffer size (e.g., in bytes), and a maximum number of bits of a multicast channel (MCH) transport block received within a TTI. The energy metrics information 420 may indicate an amount of energy consumed by the mobile device 440 for processing transmissions according to each of the various categories of UE, and/or for processing transmissions according to various configurations of a single category of UE.

The energy metrics information 420 may further include information that may indicate a HARQ target, a maximum number of HARQ retransmissions, a frequency of HARQ retransmissions, etc. The HARQ target may correspond to a probability of success for a first transmission according to a transmission configuration. The maximum number of HARQ retransmissions may indicate a maximum number of times that the base station 410 is to retransmit information to the mobile device 440 (e.g., in response to receiving a negative acknowledgement (NACK), periodically irrespective of receiving a NACK, etc.). The frequency of HARQ retransmissions may indicate how often to retransmit information to the mobile device 440 (e.g., in response to receiving a NACK, periodically irrespective of receiving a NACK, etc.). The energy metrics information 420 associated with the HARQ target, the maximum number of HARQ retransmissions, the frequency of HARQ retransmissions, etc. may further include energy consumption information that may indicate an amount of energy consumed at the mobile device 440 for processing the transmissions and/or the retransmission of the transmissions using HARQ.

In an aspect, the energy metrics information 420 associated with the mobile device 440 may include metrics associated with one or more services provided by or to the mobile device 440.

The services may include multimedia services (e.g., a video streaming service, an audio streaming service, or a combination of video and audio streaming services executing at the mobile device 440), voice services (e.g., a telephone call received or initiated from the mobile device 440), a gaming service (e.g., a multiplayer video game executing at the mobile device 440), a file transfer service (e.g., downloading of a file to or uploading a file from the mobile device 440), a data transfer service (e.g., a web browser application executing at the mobile device 440), or another service provided by the mobile device 440 that utilizes transmissions between the base station 410 and the mobile device 440 to receive and/or transmit data.

In an aspect, each of the services provided by or to the mobile device 440 may be associated with a quality of service (QoS), and/or one or more services (e.g., the multimedia streaming service, the gaming service, the voice service, etc.) being provided by or to the mobile device 440. For example, a multimedia service providing a video streaming capability at the mobile device 440 may require a minimum QoS (e.g., a minimum bandwidth, a minimum data rate to provide video content at a minimum resolution specified by user controlled settings or by an application providing the multimedia service, etc.). For example, the energy metric information 420 may include an energy metric associated with the multimedia service, and may indicate the minimum bandwidth, the minimum data rate, etc. required to provide the video content to the mobile device 440 at the minimum QoS required by the multimedia service. Additionally, the energy metric information 420 may include information associated with an energy consumption of the mobile device 440 for processing transmissions in connection with each of the services provided by the mobile device 440. The energy consumption may vary depending on a configuration (e.g., a MCS, a CA scheme, a block size, etc.) of the transmissions. In an aspect, the configuration of the transmission may be dependent upon the minimum QoS.

For example, an energy metric associated with the video streaming service may include configuration information associated with configuration of a transmission of information from the base station 410 to the mobile device 440 in connection with the multimedia service to facilitate power management of the mobile device 440. The energy consumption of the mobile device 440 may vary for processing the transmission of multimedia data using different MCSs, using different transmission modes, or using different CA schemes.

Additionally, some MCSs, transmission modes, and/or CA schemes may not provide the minimum QoS required by the multimedia service. The energy metrics information 420 may include information indicating whether transmissions configured according to various MCSs, various transmission modes, and/or various CA schemes provide the minimum QoS required by the multimedia service. Furthermore, the energy metrics information 420 may include similar information for other services (e.g., the voice services, the gaming services, the audio streaming services, etc.) provided by or to the mobile device 440.

During operation, the base station 410 may identify an energy metric associated with the mobile device 440. The energy metric may be associated with the mobile device 440, and may include one or more parameters for power management of the mobile device 440. The one or more parameters may include at least one parameter that affects an amount of energy consumed by the mobile device 440 during processing of the transmission. Additionally, the one or more parameters may include any of the capabilities and/or parameters described above with respect to the energy metrics information 420.

In an aspect, the base station 410 may identify the energy metric by querying the energy metrics information 420 stored at the database 418. The query may be generated by the base station 410 based on information received from the mobile device 440. For example, the base station 410 may receive a message from the mobile device 440. The message may include information that may indicate various functions supported by the mobile device 440 or a service to be provided by or to the mobile device 440. The base station 410 may determine the capability of the mobile device 440 based on the message (or based on the query of the energy metrics information 420), and may identify an energy metric to be used to configure a transmission between the base station 410 and the mobile device 440 based, at least in part, on the various functions supported by the mobile device 440. For example, the mobile device 440 may indicate to the base station 410 that the mobile device 440 supports a power management mode of operation where the base station 410 may assist the mobile device 440 to facilitate a management of the power consumption by the mobile device 440.

In an aspect, the mobile device 440 may autonomously enter into the power management mode. In an additional or alternative aspect, the base station 410 may determine whether the mobile device 440 should enter into a power management mode. The various functions supported by the mobile device 440 may indicate at least one of one or more transmission modes (TMs) supported by the mobile device 440, one or more modulation and coding schemes (MCS) supported by the mobile device 440, one or more carrier aggregation (CA) schemes supported by the mobile device 440, bandwidth capabilities of the mobile device 440, a frame structure supported by the mobile device 440, a category of the mobile device 440, interference management techniques supported by the mobile device 440, one or more duplex modes supported by the mobile device 440, other functions supported by the mobile device 440, and other parameters described above in connection with the energy metrics information 420, or a combination thereof.

In an aspect, the message indicating the various functions supported by the mobile device 440 may be provided to the base station 410 upon initiating or modifying a radio resource control (RRC) connection between the mobile device 440 and the base station 410. In an aspect, the information indicating the various functions supported by the mobile device 440 may include information associated with a model number of the mobile device 440, and the base station 410 may query the energy metrics information 420 using the model number to identify the various functions supported by the mobile device 440. In an additional or alternative aspect, the message may include information identifying a SKU of the mobile device 440, and the SKU may be used to identify (e.g., by querying the energy metrics information 420) the various functions supported by mobile device 440.

In an additional or alternative aspect, the information indicating the various functions supported by the mobile device 440 may be provided as a bitmap that includes a plurality of binary indicators corresponding to the various functions supported by the mobile device 440. For example, a first bit of the bitmap may indicate whether the mobile device 440 supports CA schemes, where a first value (e.g., a value of one) of the first bit may indicate the mobile device 440 supports CA schemes, and where a second value (e.g., a value of zero) of the first bit may indicate the mobile device 440 does not support CA schemes. As another example, a second bit of the bitmap may indicate whether the mobile device 440 requires transmissions configured to accommodate a QoS, such as a QoS required by a service provided by or to the mobile device 440. A first value (e.g., a value of one) of the second bit may indicate that the mobile device 440 requires transmissions configured to accommodate the QoS, and a second value (e.g., a value of zero) of the second bit may indicate that the mobile device 440 does not require transmissions configured to accommodate a QoS.

In another additional or alternative aspect, the bitmap may include multiple bits associated with supported CA schemes, QoS requirements, or other various functions supported by the mobile device 400. For example, a first bit of the bitmap may indicate whether the mobile device supports CA schemes, and one or more additional bits may be used to indicate a maximum number of component carriers that the mobile device 440 may utilize for CA. As another example, another bit may be used to indicate whether the mobile device 440 requires transmissions configured to accommodate a QoS, and one or more other bits of the bitmap may be used to indicate the QoS.

In yet another additional or alternative aspect, the mobile device 440 may provide information identifying the energy metric to the base station 410, and the base station 410 may access the energy metrics information 420 to determine a configuration of a transmission between the base station 410 and the mobile device based on the information identifying the energy metric. For example, the mobile device 440 may determine a transmission configuration that provides a desired energy metric or power consumption for processing a transmission, and may transmit the desired energy metric to the base station 410. In an aspect, the information identifying the energy metric may include information indicating the transmission configuration (e.g., an MCS, a CA scheme, a minimum QoS, etc., or a combination thereof) to be used for transmissions between the base station 410 and the mobile device 440.

In a further additional or alternative aspect, the mobile device 440 may transmit a request to the base station 410 requesting that the base station 410 configure subsequent transmissions between the base station 410 and the mobile device 440 to manage energy consumption at the mobile device 440. The message may be transmitted from the mobile device 440 to the base station 410 in response to a determination at the mobile device 440, that an amount of battery power remaining in a battery (not shown in FIG. 1) of the mobile device 440 is less than a threshold amount of battery power. The base station 410 may identify the energy metric in response to receiving the request from the mobile device 440. In another example, the mobile device 440 may transmit a request to the base station 410 to operate in a power management mode based at least in part on a usage pattern of the mobile device 440.

In still a further additional or alternative aspect, the base station 410 may identify the energy metric based on an available network resource. For example, the base station 410 may determine an available network resource (e.g., a number of component carriers available for providing a CA scheme, a resource block allocation, a number of available resource blocks, etc.) for scheduling the transmission between the base station 410 and the mobile device 440. The energy metric may be identified based at least in part on the available network resource.

The base station 410 may configure the transmission between the base station 410 and the mobile device 440 based at least in part on the energy metric identified based in part on the available network resource. In another example, the base station 410 may determine whether a threshold amount of resources are available or a threshold amount of a resource is available.

An available resource may be any resource that may be allocated and/or scheduled by the base station 410 (e.g., using the scheduler 422). The network resources may include a number of component carriers available for allocation to the mobile device 440 (e.g., using a supported CA scheme), a number of available resource blocks available that may be allocated to transmissions between the base station 410 and the mobile device 440, an available bandwidth for the transmissions between the base station 410 and the mobile device 440, etc.

Configuring the transmission between the base station 410 and the mobile device 440 may include determining a MCS to be used for the transmission between the base station 410 and the mobile device 440. The MCS may be determined based on the identified energy metric (e.g., an energy metric associated with the one or more MCS supported by the mobile device 440). In an aspect, the base station 410 may estimate an energy consumption of the mobile device 440 for processing the transmission between the base station 410 and the mobile device 440 for each MCS supported by the mobile device 440. The MCS selected by the base station 410 may be predicted to provide a maximum reduction in energy consumption by the mobile device 440 for processing the transmission.

To illustrate, the energy metric information 420 (or a message received from the mobile device 440) may indicate that the mobile device 440 supports a first MCS (e.g., an LDPC MCS) and a second MCS (e.g., a convolutional code MCS). The base station 410 may estimate a first energy consumption by the mobile device 440 for processing the transmission configured according to the first MCS and a second energy consumption by the mobile device 440 for processing the transmission configured according to the second MCS. The base station may determine whether the first estimated energy consumption is less than the second estimated energy consumption (e.g., whether the first MCS reduces the energy consumption of the mobile device 440 more than the second MCS), and may configure the transmission accordingly. For example, if the first MCS provides a greater reduction in energy consumption than the second MCS, the base station 410 may configure the transmission according to the first MCS. If the second MCS provides a greater reduction in energy consumption than the first MCS, the base station 410 may configure the transmission according to the second MCS. Thus, the base station 410 may determine a MCS for configuring the transmission between the base station 410 and the mobile device 440 in order to cause the mobile device 440 to consume less energy for processing the transmission.

In some aspects, when determining the management of energy consumption provided by the MCSs, the base station 410 may also consider availability of network resources (e.g., a number of bits required for the transmission, a number of resource blocks available for the transmission, a block size available for the transmission) required to provide the transmission using the selected MCS. For example, different MCSs may encode data included in the transmission using different number of bits (e.g., due to different zero padding requirements, etc.). An increase in the number of bits may cause an increase in the number of resource blocks required for the transmission and/or may require a different block size. Each of these factors may affect the energy consumption of the mobile device 440 for processing the transmission between the base station 410 and the mobile device 440. In some instances, an increase in the number of resource blocks or an increased block size may not cause a corresponding increase in energy consumption (e.g., due to reduced computational complexity of a decoder for a MCS at the mobile device 440 relative to a computational complexity of another decoder for another MCS at the mobile device 440). Additionally, a MCS may require more network resources than an available amount of network resource or a maximum amount of network resources that may be allocated to the mobile device 440 (e.g., based on a configuration of the base station 410 by a service provider operating the base station 410). Thus, the base station 410 may consider additional parameters and energy metrics included in the energy metric information 420 when determining the MCS to be used to configure the transmission between the base station 410 and the mobile device 440.

Configuring the transmission between the base station 410 and the mobile device 440 may include determining a QoS associated with the transmission between the base station 410 and the mobile device 440. The transmission between the base station 410 and the mobile device 440 may be configured based, at least in part, on the determined QoS. For example, the base station 410 may determine a QoS associated with a service (e.g., an audio streaming service) being provided by or to the mobile device 440. The QoS may indicate that the service requires the transmission to have a minimum bandwidth or a minimum data rate. The base station 410 may consider the effect of the MCS on the data rate. For example, zero padding may reduce a number of bits of data included in each resource block. Thus, different block sizes may be used to configure the transmission in order to provide the requested QoS depending on the MCS estimated to provide a desired reduction in energy consumption by the mobile device 440 for processing the transmission. The base station 410 may be configured to determine whether the increased overhead (e.g., zero padding) mitigates all or a portion of the reduction in energy consumption induced by the different MCSs.

In some aspects, the QoS may cause the base station to configure the transmission independent of the energy metrics. For example, the QoS requested or required by the service provided by or to the mobile device 440 may not be satisfied unless a MCS (or another transmission configuration parameter) is used. However, the MCS (or other transmission configuration parameter) may not provide a reduction in energy consumption at the mobile device 440. Thus, in some use cases, the QoS may override the base station 410's selection of one or more parameters for configuring the transmission to reduce energy consumption by the mobile device 440.

In an aspect, the scheduler 422 may configure at least a portion of the transmission between the base station 410 and the mobile device 440. For example, the scheduler 422 may configure a transmission between the base station 410 and the mobile device 440 based on an amount of data available in a data buffer for transmission. The scheduler 422 may configure the transmission between the base station 410 and the mobile device 440 per symbol period, on a subframe basis or frame basis, or another time period, such as a transmit time interval (TTI). The scheduler 422 may schedule the transmission using a number of resource blocks.

The number of resource blocks scheduled for the transmission may be determined based at least in part on the identified energy metric. Configuring the transmission between the base station 410 and the mobile device 440 may include determining a transport block size to be used for the transmission between the base station 410 and the mobile device 440. The transport block size may be determined based at least in part on the energy metric. In an aspect, the scheduler 422 may schedule the transmission based at least in part on the transport block size.

Configuring the transmission based on the energy metrics information 420 may decrease the efficiency of a network in which the base station 410 is operating (e.g., due to increased overhead, increased computations at the base station 410, etc.). Thus, in an aspect, the base station 410 may be configured to determine whether a candidate configuration for configuring the transmission satisfies a threshold reduction in energy consumption, where the candidate configuration for configuring the transmission corresponds to a configuration determined based on the energy metrics information 420, as described above. In an aspect, the threshold reduction in energy consumption may correspond to an amount of energy per unit of data consumed (e.g., a number of Joules per bit) by the mobile device 440 during the processing of the transmission between the base station 410 and the mobile device 440. In an additional or alternative aspect, the threshold reduction in energy consumption may correspond to a percentage of total battery power consumed (e.g., five percent (5%), ten percent (10%), etc.) by the mobile device 440 during the processing of the transmission between the base station 410 and the mobile device 440.

For example, the base station 410 may determine a first energy consumption (e.g., a first amount of energy consumed or a first percentage of battery power consumed) for the transmission between the base station 410 and the mobile device 440 based at least in part on the energy metrics information 420, and may determine a second energy consumption (e.g., a second amount of energy consumed or a second percentage of battery power consumed) for a transmission between the base station 410 and the mobile device 440 independent of the energy metric (e.g., using up to a maximum data rate supported by the mobile device 440, up to a maximum number of component carriers for a CA scheme supported by the mobile device 440, etc., subject to available network resources and resource allocation parameters specified by an operator of the base station 410). The base station 410 may determine a difference between the first energy consumption and the second energy consumption. In response to a determination that the difference between the first energy consumption and the second energy consumption does not satisfy the threshold reduction in energy consumption, the base station 410 may configure the transmission between the base station 410 and the mobile device 440 independent of the energy metric. In response to a determination that the difference between the first energy consumption and the second energy consumption satisfies the threshold reduction in energy consumption, the base station 410 may configure the transmission between the base station and the mobile device is configured based at least in part on the energy metrics information 420, as described above.

Configuring the transmission according to the energy metrics information 420 only when the threshold reduction in energy consumption is satisfied may provide a tradeoff between network efficiency and reducing power consumption of one or more mobile devices served by the base station 410, whereby network efficiency is decreased only when a threshold energy efficiency is experience by the mobile device 440, or another mobile device served by the base station 410. The threshold reduction in energy consumption may be different for different mobile devices (e.g., different categories of mobile devices, mobile devices manufactured by different manufacturers, different models of mobile devices manufactured by a single manufacturer, etc.). Thus, a first configuration for the transmission may satisfy the threshold reduction in energy consumption when the mobile device 440 is a first mobile device or a first mobile device type (e.g., a smartphone, a tablet computing device, a laptop, etc.), and may not satisfy the threshold reduction in energy consumption when the mobile device 440 is a second mobile device or a second mobile device type (e.g., a smartphone, a tablet computing device, a laptop, etc.).

In an aspect, the threshold reduction in energy consumption may be dynamically modified based on available network resources, based on a number of mobile devices served by the base station 410, etc. For example, when network resources are idle or when the base station 410 is serving only a small number of mobile devices, the decreases in network efficiency caused by configuration of transmissions based on the energy metrics information 420 may be lessened or negligible while simultaneously providing substantial reductions in energy consumption at the mobile devices served by the base station 410. In such instances, the threshold reduction in energy consumption may be lower than when the base station 410 is serving a large number of mobile device or when a threshold amount of network resources are not idle. The base station may be configured to dynamically modify the threshold reduction in energy consumption based on a determination of available network resources, based on a determination of a number of mobile devices served by the base station, or both.

In an aspect, the base station 410 may periodically determine whether to modify a configuration of a subsequent transmission between the base station 410 and the mobile device 440 based at least in part on the energy metric information 420. For example, the base station 410 may determine, based on the energy metrics information 420, whether to maintain or modify a CA scheme utilized for the subsequent transmission, whether to maintain or modify an amount of bandwidth allocated to the mobile device 440 for the subsequent transmission, whether to enable or disable a transmission mode (e.g., MU-MIMO) for the subsequent transmission, etc. As another example, the base station 410 may determine, based on the energy metrics information 420, whether to use a different MCS for the subsequent transmission, whether to maintain or modify a resource block allocation for the subsequent transmission, whether to maintain or modify a transport block size for the subsequent transmission, whether to maintain or modify one or more HARQ parameters, etc. The determination of whether to modify the configuration of the subsequent transmission between the base station 410 and the mobile device 440 may be based on changes in available network resources, changes to a service being provided by or to the mobile device 440, changes in the number of mobile devices served by the base station 410, or other factors. The base station 410 may determine whether any of these changes suggest a different transmission configuration based on the energy metrics information 420. For example, an increase in available network resources may enable the base station 410 to allocate a different amount of bandwidth for the subsequent transmission which may provide a greater reduction in energy consumption by the mobile device 440 during the subsequent transmission. As another example, a decrease in the number of mobile devices served by the base station 410 (or an adjacent base station) may reduce an amount of interference experienced by the mobile devices served by the base station 410. The reduced amount of interference may cause the base station 410 to configure the subsequent transmission with a different HARQ parameter (e.g., less frequent HARQ retransmissions, etc.), which may reduce the energy consumption by the mobile device 440 (e.g., due to a reduced amount of decoding and/or demodulation performed by the mobile device 440). By periodically determining whether to modify the configuration of the subsequent transmission between the base station 410 and the mobile device 440 based on the energy metrics information 420, the base station 410 may proactively and dynamically adapt to changes in real-time network conditions in order to provide transmissions configured to cause reduced energy consumption by the mobile device 440 while also minimizing or reducing network resource inefficiencies.

In an aspect, the energy metrics information 420 stored at the database 418 may be generated, at least in part, based on testing data generated by manufacturers of the mobile devices or by a third party providing certification of the energy metrics information 420. The energy metrics information 420 may be constructed for each different mobile device 440 (e.g., per SKU of the mobile device 440). In an aspect, the energy metrics information may be dynamically updated. For example, a software and/or firmware update may be released for the mobile device 440. The update(s) may cause changes in the energy metrics information 420 associated with the mobile device 440. The energy metrics information 420 associated with the mobile device 440 may be updated to reflect the changes caused by the update(s). In an aspect, the energy metrics information 420 may be determined by testing different power consumption rates for different mobile devices using different transmission configurations/parameters, such as during a certification testing of the different mobile devices.

In an aspect, the energy metrics information 420 may include one or more power management profiles. The power management profiles may be grouped based on one or more device types (e.g., a mobile device category, a stock keeping unit (SKU) identifier associated with the mobile device, a manufacturer of the mobile device, a model number of the mobile device, etc.). For example, a single mobile device, such as the mobile device 440, may be associated with one or more power management profiles. A first profile may include a first set of parameters, energy metrics, energy consumption data, mobile device capabilities, etc., and a second power management profile may include a second set of parameters, a second set of energy metrics, second energy consumption data, a second set of mobile device capabilities, etc. The base station 410 may select a power management profile based on the available network resources, as described above, based on a request received form the mobile device 440, based on a combination of various functions supported by the mobile device 440, available network resources, an amount of data associated with the mobile device 440 that is stored in a buffer (e.g., a buffer of the memory 414, a buffer of the scheduler 422, etc.) of the base station 410. In some aspects, the mobile device 440 may transmit a request for a power management profile to the base station 410, and the base station 410 may configure subsequent transmissions based on the requested power management profile. In an additional or alternative aspect, during RRC connection establishment, the mobile device 440 may provide an indication of a preferred power management profile to the base station 410, and the base station 410 may store information indicating the preferred power management profile at the memory 414 in association with the mobile device 440. When network resources permit, or for another reason described elsewhere herein, the base station may configure transmissions between the base station 410 and the mobile device 440 based on the preferred power management profile. If the network resources do not permit utilization of the preferred power management profile, the base station 410 may select another power management profile appropriate for the mobile device 440 (e.g., using one or more of the other techniques describes elsewhere herein). Each of the power management profiles may include one or more energy metrics, one or more parameters corresponding to the one or more energy metrics, one or more functions supported by the mobile device 440 corresponding to the one or more energy metrics and/or the one or more parameters, etc., and may be used to facilitate management of the power consumption by the mobile device 440. In an aspect, each of the power management profiles may be associated with a bitmap (e.g., one of the bitmaps described above) that may indicate the capabilities, the parameters, and the energy metrics to be used for managing the power consumption by the mobile device 440.

In an aspect, the mobile device 440 may be configured to provide the energy metrics information to the base station 410 (e.g., during initiation of an RRC connection). For example, as shown in FIG. 1, a database 448 may be stored at the memory 444 of the mobile device 440. The database 448 may include the energy metrics information 450 that includes information indicating various functions supported by the mobile device 440, energy consumption information associated with processing transmissions configured according to one or more of the various functions supported by the mobile device 440, one or more parameters that may be used to configure transmissions between the base station 410 and the mobile device 440, or other information. The mobile device 440 may transmit the energy metrics information 450 to the base station 410 and the base station 410 may identify an energy metric for configuring the transmission based on the energy metrics information 450.

In an aspect, in addition to providing the energy metrics information 450 to the base station, the mobile device 440 may provide information indicating a desired configuration for transmissions between the base station 410 and the mobile device. The base station 410 may determine whether available resources and other network conditions enable the transmission to be configured using the desired configuration indicated by the mobile device 440. If the available resources and other network conditions do not enable the transmission to be configured using the desired configuration, the base station 410 may determine whether another configuration may be used to cause reduced power consumption by the mobile device 440 for processing the transmission, as described above.

Thus, one or more aspects of the system 400 provide for configuring transmissions to cause reduced power consumption by a mobile device for processing the transmissions. Additionally, aspects of the system 400 account for network resource efficiency when determining the configuration of the transmissions, providing a tradeoff between energy efficiency of mobile devices served by a base station and resource efficiency of a network in which the base station is operating. It is noted that, although FIG. 4 is described primarily with reference to downlink (DL) transmissions between the base station 410 and the mobile device 440, one or more aspects of the present disclosure may be used to configure uplink (UL) transmissions between the base station 410 and the mobile device 440. For example, the base station 410 may allocate uplink resource blocks based on the energy metrics information 420 (or the energy metrics information 450) associated with the mobile device 440, or may configure a transmission power of the mobile device 440 based on the energy metrics information 420. Configuring UL transmissions based on the energy metrics information 420 may facilitate reduced power consumption by the mobile device 440 during transmission of the UL transmissions between the base station 410 and the mobile device 440.

It is noted that the exemplary parameters, the various functions supported by the mobile device, the energy metrics, etc. used for managing the power consumption by the mobile device 440, as described herein, are provided for purposes of illustration, rather than by way of limitation. Additional energy metrics, supported functions, and parameters may be used by the system 400 for managing the power consumption of the mobile device 440.

Furthermore, the base station 410 may determine the configuration of the transmission based on a single supported function, a single parameter, or a single energy metric, or based on any combination of supported functions, parameters, and energy metrics. Additionally, some supported functions, parameters, and/or energy metrics, when used in combination with other supported functions, parameters, and/or energy metrics, may reduce the power consumption by the mobile device 440 for processing the transmission, while other combinations may increase the power consumption by the mobile device 440 for processing the transmission.

Thus, the base station 410 may iteratively determine the energy metric(s) to be used for managing the power consumption of the mobile device 440 in order to maximize the reduction in energy consumption by the mobile device 440 during processing of the transmission.

For example, as described in more detail below with reference to FIGS. 6-8, in an aspect, the base station 410 may determine the MCS to be used to configure the transmission using an iterative process. During a first iteration, various configurations (e.g., different coding rates, transport block sizes, resource block assignments, etc.) may be evaluated with respect to a first MCS to identify a configuration of the first MCS providing a highest energy efficiency (e.g., a lowest energy consumption by the mobile device). During a subsequent iteration, the configuration of the first MCS identified during the first iteration may be compared to other configurations of a second MCS to determine whether the configuration of the first MCS provides a highest energy efficiency with respect to each of the other configurations associated with the second MCS. Each subsequent iteration may determine a configuration of a MCS providing the highest energy efficiency for the transmission, and the transmission may be configured using the MCS providing the highest energy efficiency. It is noted that, as explained above, the iterative process may account for other factors, such as available network resources, block sizes, use of carrier aggregation techniques, etc., when iteratively determining the configuration of the transmission. In an additional or alternative aspect, the first iteration may evaluate multiple MCSs, and the subsequent iterations may iteratively determine a configuration of a MCS providing the highest energy efficiency for the transmission. It is noted that, as explained above, the iterative process may account for other factors, such as available network resources, block sizes, use of carrier aggregation techniques, etc., when iteratively determining the configuration of the transmission.

Additional aspects and details regarding iteratively determining the configuration of the transmission are described below with respect to FIGS. 6-8.

Additionally, although described in connection with transmissions between the base station 410 and the mobile device 440, one or more aspects of the present disclosure may be used for transmissions in machine-type-communication (MTC) applications and deployments. Furthermore, one or more aspects of the present disclosure may be complimentary to, and used in conjunction with existing power conservation schemes, such as a discontinuous reception (DRX) scheme.

Figure 5:
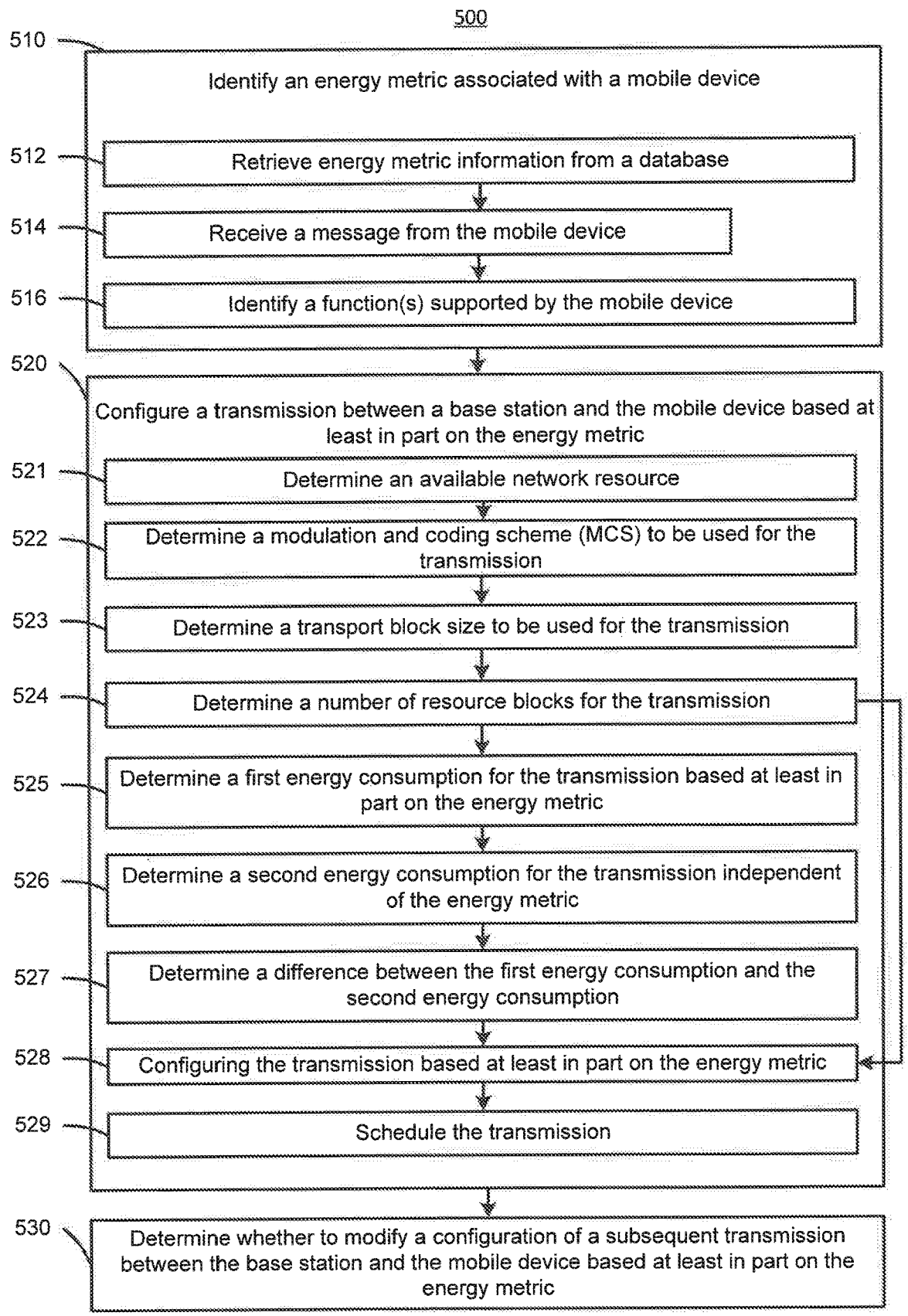
FIG. 5 is a flow diagram illustrating an exemplary method for managing a power consumption of a mobile device, in accordance with various aspects of the present disclosure.

Referring to FIG. 5, a flow diagram illustrating an exemplary method for managing a power consumption of a mobile device, in accordance with various aspects of the present disclosure is shown as a method 500. In an aspect, the base station may be the base station 410 of FIG. 4 and the mobile device may be the mobile device 440 of FIG. 4. At 510, the method 500 includes identifying an energy metric associated with a mobile device. In an aspect, the method 500 includes, at 512, retrieving the energy metric from a database. In an aspect, the database may be the database 448 of FIG. 4 and the energy metric may be identified from among the energy metric information 450, where the identified energy metric is associated with the mobile device. In an additional or alternative aspect, the method 500 includes, at 514, receiving a message from the mobile device, where the message includes energy metric information. For example, the message may include all or a portion of the energy metric information 420 of FIG. 4. The energy metric may be associated with an amount of energy consumer by the mobile device for processing transmissions according to various configurations.

The various configurations of the transmissions may be associated with different functions supported by the mobile device, such as a transmission mode supported by the mobile device, a modulation and coding scheme (MCS) supported by the mobile device, a carrier aggregation (CA) scheme supported by the mobile device, a quality of service (QoS) requirement of a service provided by the mobile device. In an aspect, at 516, the method 500 includes identifying a function(s) supported by the mobile device. In an aspect, the function(s) may be identified based on information received from the mobile device, such as' information provided to the base station upon establishing a connection between the mobile device and the base station. In an aspect, the base station may identify the energy metric using iterative process to maximize a reduction in energy consumption by the mobile device, where the iterative process estimates a total energy reduction in energy consumption by the mobile device for different combinations of energy metrics.

At 520, the method 500 includes configuring a transmission between the base station and the mobile device based at least in part on the energy metric. Configuring the transmission may include determining a first energy consumption for the transmission between the base station and the mobile device based at least in part on the energy metric, and determining a second energy consumption for a transmission between the base station and the mobile device independent of the energy metric. Configuring the transmission may further include determining a difference between the first energy consumption and the second energy consumption, and configuring the transmission between the base station and the mobile device based at least in part on the energy metric when the difference between the first energy consumption and the second energy consumption satisfies a threshold, or configuring the transmission between the base station and the mobile device independent of the energy metric when the difference between the first energy consumption and the second energy consumption does not satisfy a threshold. Additionally, configuring the transmission may include scheduling the transmission using a number of resource blocks. The number of resource blocks scheduled for the transmission may be determined based at least in part on the energy metric.

In an aspect, configuring the transmission based at least in part on the energy metric may also include, at 521, determining an available network resource. The available networks resources may be used to determine a configuration of the transmission. For example, when the available network resources indicate that multiple component carriers are available and the function(s) supported by the mobile device indicate that CA is supported, a determination of whether to use CA for the transmission may be made. Other information that may be used to determine the configuration of the transmission may include cell loading information, heuristic information (e.g., parameters), historical information, as described in more detail with reference to FIGS. 6-8. In an aspect, the method 500 may include, at 522, determining a modulation and coding scheme (MCS) to be used for the transmission. The MCS may be determined based on the function(s) supported by the mobile device. For example, the function(s) supported by the mobile device may identify one or more MCSs supported by the mobile device, and the energy metric information may indicate a power consumption by the mobile device for processing transmissions configured according to each of the one or more MCSs supported by the mobile device. The MCS to be used for the transmission may be an MCS identified as consuming the least power by the mobile device for processing transmissions. In an aspect, the method 500 includes, at 523, determining a transport block size. In an aspect, the transport block size may correspond go a block size that provides a sufficient number of bits for the MCS determined at 522. In an aspect, the method 500 includes, at 524, determining a number of resource blocks for the transmission. In an aspect, the number of resource blocks may be determined based on an amount of data to be transmitted during the transmission, the MCS determined at 522, and the transport block size determined at 523. In an aspect, the method includes, at 528, configuring the transmission based on the energy metric. For example, the transmission may be configured to provide a greatest reduction in power consumption by the mobile device for processing the transmission, as indicated by the energy metric information, where the reduced power consumption is provided by the MCS determined at 522, the transport block size determined at 523, and the number of resource blocks determined at 524. In an aspect, in response to configuring the transmission based on the energy metric (or independently of the energy metric), the method 500 may include, at 529, scheduling the transmission to the mobile device.

In an aspect, configuring the transmission may include evaluating multiple configurations to determine a configuration providing a lowest energy consumption by the mobile device for processing the transmission. For example, in an aspect, at 525, the method 500 may include determining a first energy consumption for the transmission based at least in part on the energy metric, and, at 526, determining a second energy consumption for the transmission based at least in part on the energy metric. The first energy consumption may be determined based on a first configuration for the transmission, and the second energy consumption may be based on a second configuration for the transmission, where the first configuration and the second configuration are different with respect a MCS, a coding rate, a transport block size, a number of resource blocks, or a combination thereof. At 527, the method 500 includes determining a different between the first energy consumption and the second energy consumption (e.g., whether the first configuration reduces the energy consumption by the mobile device more than the second configuration).

In an aspect, the first configuration may be a configuration generated based on the energy metric information to reduce energy consumption by the mobile device, and the second configuration may be a configuration generated independent of the energy metric information. When the difference between the energy consumption by the mobile device according to the first configuration and the energy consumption provided by the second configuration does not satisfy a threshold, the transmission may be scheduled according to the second configuration, and when the difference between the energy consumption by the mobile device according to the first configuration and the energy consumption provided by the second configuration satisfies the threshold, the transmission may be scheduled according to the first configuration. This may provide a tradeoff between the additional computational complexity for dynamically configuring transmissions to reduce energy consumption by the mobile device, and network performance. In an additional or alternative aspect, the first configuration and the second configuration may be generated based on the energy metric information, and the difference between the energy consumption provided by the first configuration and the second configuration may be used to select a configuration for the transmission that provides a lowest energy consumption by the mobile device for processing the transmission.

At 530, the method 500 includes determining whether to modify a configuration of a subsequent transmission between the base station and the mobile device based at least in part on the energy metric. The base station may determine whether to modify the configuration periodically according to a time interval, upon detecting a change in available network resources, in response to a change in a number of mobile devices served by the base station, or based on other criteria. In an aspect, determining whether to modify a configuration of the subsequent transmission may include determining whether any of the information used to determine the previous transmission configuration has changed. If none of the information used to determine the previous transmission configuration has changed, the method 800 may schedule the subsequent transmission using the previously determined transmission configuration. If at least a portion of the information has changed, the method 800 may be repeated in all or in part (only the part associated with the information that has changed) to determine the configuration of the subsequent transmission.

Figure 6:
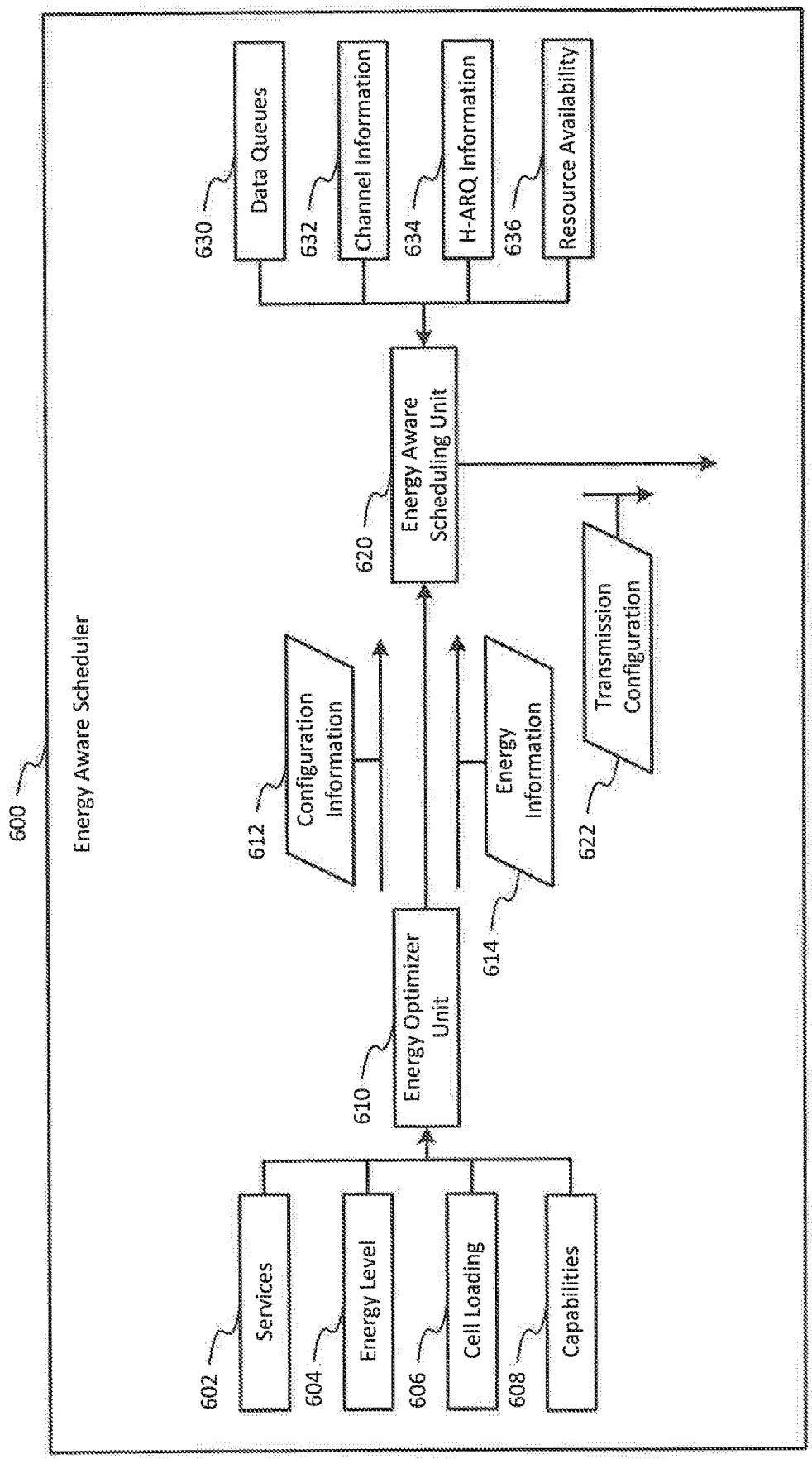
FIG. 6 is a block diagram illustrating aspects of an energy aware scheduler, in accordance with various aspects of the present disclosure.

Referring to FIG. 6, a block diagram illustrating aspects of an energy aware scheduler, in accordance with various aspects of the present disclosure is shown as an energy aware scheduler 600. As shown in FIG. 6, the energy aware scheduler 600 includes an energy optimizer unit 610 and an energy aware scheduling unit 620. In an aspect, the energy aware scheduler 600 may be the scheduler 422 of the base station 440 of FIG. 4, and may be adapted to determine a configuration to be used for a transmission between the base station 440 and a mobile device (e.g., the mobile device 440 of FIG. 4) based, at least in part, on an energy metric associated with the mobile device.

The energy optimizer unit 610 may be adapted to generate configuration information 612 that may be provided to the energy aware scheduling unit 620 for use in configuring the transmission according to aspects of the present disclosure. In an aspect, the configuration information 612 may include one or more semi-dynamic parameters. In an aspect, the energy optimizer unit 610 may determine the one or more semi-dynamic parameters based on services 602, an energy level 604, cell loading information 606, capabilities information 608, or a combination thereof. The services 602 may correspond to services being provided to or requested by the mobile device, and the energy level 604 may be associated with a desired energy level (e.g., a target energy level) of the mobile device. In an aspect, the services 602 and the energy level 604 may be determined based on information received from the mobile device (e.g., information received during initiation of the RRC connection). In an aspect, the cell loading information 606 may be associated with a current loading of a cell serving the mobile device (e.g., a cell provided by the base station including the energy aware scheduler 600), and may include information representative of a number of mobile devices being served by the base station of the serving cell and availability of resources within the serving cell. In an additional or alternative aspect, the cell loading information 606 may include loading information associated with a current loading of one or more neighbor cells adjacent to the serving cell.

In an aspect, the capabilities information 608 may include information associated with a category of the mobile device, a carrier aggregation (CA) scheme(s) supported by the mobile device (e.g., a maximum number of component carriers supported by the mobile device for CA), a bandwidth associated with the mobile device, a duplex mode supported by the mobile device, a frame structure associated with or supported by the mobile device (e.g., a frame structure required by each of the services 602, a frame structure that may be used to provide the services 602, etc.), a HARQ configuration associated with the mobile device, a DRX scheme supported by the mobile device, a semi-persistent scheduling (SPS) scheme supported by the mobile device, other information associated with various functions supported by the mobile device, or a combination thereof. In an aspect, the one or more semi-dynamic parameters may be parameters that are not to be optimized by the energy aware scheduling unit 620, and may include the capabilities information 608, or a portion thereof. For example, the one or more semi-dynamic parameters may include a parameter associated with a transmission mode of the mobile device, which may not change during the transmission, and may not be optimized by the energy aware scheduling unit 620.

In an aspect, one or more of the semi-dynamic parameters may be determined based on historical data. For example, the cell loading information 606 may be determined based on long-term cell loading information stored in a database accessible to the energy optimizer unit 610. As another example, information associated with the mobile device (e.g., information associated with the services 602, the energy level 604, and the capabilities 608) may be determined based on one or more prior transmissions between the base station (e.g., the base station that includes the energy aware scheduler 600) and the mobile device.

In an additional or alternative aspect, one or more of the semi-dynamic parameters (e.g., heuristic information described above) may be determined heuristically. For example, reducing a number of MIMO layers may improve energy efficiency for the mobile devices.

Therefore, a single-layer transmission may be chosen as one of the semi-dynamic parameters, and assumed to be a fixed parameter during optimization of other parameters by the energy aware scheduling unit 620. The heuristics information (e.g., semi-dynamic parameters) may improve the ability of the energy aware scheduler 600 to manage power for many types of mobile devices. For example, by determining one or more of the semi-dynamic parameters (e.g., heuristic information) for managing power of mobile devices heuristically, the energy aware scheduling unit 620 may not require information specific to any mobile device, mobile device type, or mobile device manufacturer. Thus, for semi-dynamic parameters (e.g., heuristic information) that may be determined using heuristics, less information may need to be stored and accessible to the energy aware scheduler 600. Additionally, using heuristic information (e.g., semi-dynamic parameters) may reduce the cost and complexity of certifying the energy metric information (e.g., during certification of a mobile device for use on a service provider network).

The energy optimizer unit 610 may be adapted to provide the configuration information 612 to the energy aware scheduling unit 620. Additionally, the energy optimizer unit 610 may provide energy information 614 to the energy aware scheduling unit 620. In an aspect, the energy information 614 may include a database storing information that may be used to determine an amount of energy consumed by the mobile device for various configurations of the transmission. For example, the database may include information indicating an amount of energy consumed by the mobile device per unit of data (e.g., Joules/bit) for various configurations of the transmission. In an aspect, the database may be a lookup table. In an additional or alternative aspect, the database may include at least a portion of the energy metrics information 420 of FIG. 4. In an additional or alternative aspect, the database may include at least a portion of the energy metrics information 450 of FIG. 4. In an aspect, the energy information 614 may be configured for the mobile device. For example, the energy optimizer unit 610 may filter the entries of the database such that only energy metric information associated with the configuration information 612 may be provided to the energy aware scheduling unit 620. In an additional or alternative aspect, the energy aware scheduling unit 620 may retrieve the energy information 614 from the database. In an aspect, the database may be provided to the base station by the mobile device (e.g., during registration between the base station and the mobile device). In an additional or alternative aspect, the database may be provided to the base station by an operator providing the base station. For example, a manufacturer of the mobile device may provide the database to the operator as part of a certification process (e.g., a process whereby the operator authorizes the use of the mobile device for use on the operator's network(s)). In an aspect, the database may be SKU-based. For example, information stored in the database may be organized by mobile device SKU, whereby different mobile devices manufactured by one or more manufacturers each have energy information stored in the database.

In an aspect, the configuration information 612 may include a profile associated with the one or more semi-dynamic parameters. For example, based on the services 602 and the cell loading information 606, the energy optimizer unit 610 may select a profile including the one or more semi-dynamic parameters that satisfy the capabilities information 608 while providing a threshold level of energy efficiency. For example, when the services 602 indicate a low/medium resolution video conferencing service is being provided to or is to be provided to the mobile device, the selected profile(s) (e.g., the configuration information 612) may be a profile(s) involving narrowband transmissions and SPS, and may provide the threshold level of energy efficiency. Using profiles may limit the number of parameters that are optimized by the energy aware scheduling unit 620, which may reduce the computational complexity of the energy aware scheduling unit 620, and may reduce the cost of the energy aware scheduler 600. Additional aspects of the configuration information 612 and the energy information 614 are described below.

The energy aware scheduling unit 620 may be adapted to configure the transmission based, at least in part, on the configuration information 612 and the energy information 614.

For example, the energy aware scheduling unit 620 may determine a modulation and coding scheme (MCS) to be used for the transmission. In an aspect, the MCS may be determined from among a plurality of MCSs. The plurality of MCSs may include a turbo encoding scheme, a low density parity check (LDPC) encoding scheme, a convolutional code encoding scheme, etc. In an aspect, the energy aware scheduling unit 620 may determine the MCS to be used for the transmission by performing a lookup using the configuration information 612 and the energy information 614. In an aspect, each entry in the energy information 614 may be associated with a different profile that may indicate an amount of energy consumed by the mobile device to decode a transmission configured using one of the plurality of MCSs, a transmission mode, and a number of resources blocks. Using profiles may limit the number of parameters that are optimized by the energy aware scheduling unit 620, which may reduce the computational complexity of the energy aware scheduling unit 620, and may reduce the cost of the energy aware scheduler 600.

In an aspect, the energy aware scheduling unit 620 may determine the configuration of the transmission based on other information in addition to the configuration information 612 and the energy information 614. For example, in an aspect, the energy aware scheduling unit 620 may configure the transmission based on data queue information 630, channel information 632, HARQ information 634, and resource availability information 636. For example, one or more services (e.g., the services 602) may be provided to the mobile device, and each of the one or more services may be associated with a data queue. Data to be transmitted in connection with each of the one or more services may be organized into the data queues 630 according to a quality of service (QoS) associated with each of the one or more services. During transmission, data stored in a data queue associated with a highest QoS may be processed for transmission by the energy aware scheduling unit 620 before other data associated with a lesser QoS, and so on. The QoS associated with data being scheduled for transmission may affect the MCS selected by the energy aware scheduling unit 620, as well as other parameters, such as block size, resource block allocations, bandwidth requirements, etc. For example, data associated with a first QoS may best be transmitted using a first MCS, and data associated with a second QoS may use the first MCS or another MCS (e.g., another MCS providing a reduced energy consumption by the mobile device).

Thus, the energy aware scheduling unit 620 may determine the configuration of the transmission based, at least in part, on the data queues 630 and associated QoS requirements. Additional aspects of determining the configuration of the transmission based on the data queues 630 are described with reference to FIG. 7.

In an aspect, the channel information 632 may be associated with quality of a communication channel between the base station and the mobile device, and may be used by the energy aware scheduling unit 620 to configure the transmission. For example, the channel information 632 may indicate poor channel conditions between the base station and the mobile device, and an MCS providing improved performance in poor channel conditions may be selected for the transmission. However, such an MCS may require a larger resource block size (e.g., due to zero padding and/or parity bit requirements), which may increase the amount of energy consumed by the mobile device to decode the transmission. In an aspect, the channel information 632 may include information indicating a signal to interference plus noise ratio (SINR), and the configuration of the transmission may be determined based, at least in part, on the SINR. In an additional or alternative aspect, the channel information 632 may include information associated with channel quality index (CQI) information, rank indication (RI) information, precoding matrix indicator (PMI) information, Doppler spread estimate information, or a combination thereof received from the mobile device, and may be used by the energy aware scheduling unit 620 to determine the configuration of the transmission. Additional aspects of determining the configuration of the transmission based on the channel information 632 are described with reference to FIG. 7.

In an aspect, the energy aware scheduling unit 620 may further configure the transmission based on the HARQ information 634. For example, as explained above, HARQ information 634 may indicate a HARQ target (e.g., a probability of success for a first transmission according to a transmission configuration), a maximum number of HARQ retransmissions (e.g., a maximum number of times that the base station is to retransmit information to the mobile device 440 in response to receiving a negative acknowledgement (NACK) or periodically irrespective of receiving a NACK, etc.), and a frequency of HARQ retransmissions (e.g., how often to retransmit information to the mobile device). The energy information 614 may include energy consumption information associated with an amount of energy consumed by the mobile device for processing the transmissions and/or the retransmission of the transmissions using HARQ, as described above with reference to FIG. 4. The energy aware scheduling unit 620 may determine the configuration of the transmission based in part on the HARQ information 634. In an aspect, the energy aware scheduling unit 620 may determine the MCS to be used for the transmission based at least in part on the HARQ information 634.

In an aspect, the energy aware scheduling unit 620 may further configure the transmission based on the resource availability information 636. The resource availability information 636 may indicate one or more resources that are available for providing the transmission between the base station and the mobile device. For example, the resource availability information 636 may identify a number of component carriers that may be assigned to the transmission, a bandwidth that may be used to provide the transmission, other availability of other resources, or a combination thereof, that may be allocated to the transmission. It is noted that the number of available component carriers may be more than a maximum number of component carriers that the mobile device may support for CA purposes, and the number of component carriers assigned to the transmission may be less than or up to the maximum number of available component carriers supported by the mobile device for CA, where the number of component carriers assigned to the transmission may be determined based on the energy metrics (e.g., the energy information 614 or the energy metrics information 420 of FIG. 4). Further, it is noted that available bandwidth may exceed a maximum allowable bandwidth for the mobile device (e.g., as set by the operator of the base station according to a service contract associated with the mobile device), or may be less than a minimum required bandwidth (e.g., a bandwidth providing a minimum QoS for a service) associated with the mobile device. Additional aspects of determining the configuration of the transmission based on the available resource information 636 are described with reference to FIG. 7.

As noted above, the energy aware scheduling unit 620 may determine a transmission configuration 622 for the transmission between the base station and the mobile device. The transmission configuration 622 may identify the MCS to be used for the transmission, a transport block size associated with the transmission, and a resource block assignment for the transmission, as described in more detail with reference to FIG. 7. Additionally, the transmission configuration 622 may indicate a duplex mode for the transmission, a bandwidth allocated for the transmission, a number of component carriers assigned to the transmission (e.g., when CA is used), etc. In an aspect, the energy aware scheduling unit 620 may provide the transmission configuration 622 to a transmit processing chain that is adapted to generate the transmission between the base station and the mobile device in accordance with the transmission configuration 622. For example, the transmit processing chain may retrieve data to be transmitted during a transmit time interval (TTI) from a one of the data queues 630, and may generate the transmission in accordance with the transmission configuration 622. In an additional or alternative aspect, the energy aware scheduler 600 may generate the transport blocks in accordance with the resource block assignment and MCS included in the transmission configuration 622.

In an aspect, the energy optimizer unit 610 and the energy aware scheduling unit 620 may operate at different time intervals. For example, the energy optimizer unit 610 may be adapted to determine the configuration information 612 (e.g., the one or more semi-dynamic parameters) according to a first time interval, and the energy aware scheduling unit 620 may operate to configure transmissions according to a second time interval. In an aspect, the first time interval may be associated with an RRC connection (e.g., the energy optimizer unit 610 may be configured to determine the one or more semi-dynamic parameters once per RRC connection), or a superframe (e.g., the energy optimizer unit 610 may be configured to determine the one or more semi-dynamic parameters once per superframe). In an aspect, the second time interval may be associated with a transmission time interval (TTI) (e.g., the energy aware scheduling unit 620 may configure transmissions to the mobile device based, at least in part, on the configuration information 612 and the energy information 614 during each TTI). Thus, the energy aware scheduling unit 620 may configure transmissions during multiple TTIs based on a single set of semi-dynamic parameters determined by the energy optimizer unit 610. In an aspect, although transmissions may be configured for multiple TTIs based on a single set of semi-dynamic parameters, each of the transmissions may not be configured identically. For example, during each TTI, a number of available resources may be different, a QoS of data to be sent from one of the data queues may be different, etc., and such differences may cause the transmissions to be configured differently.

Figure 7:
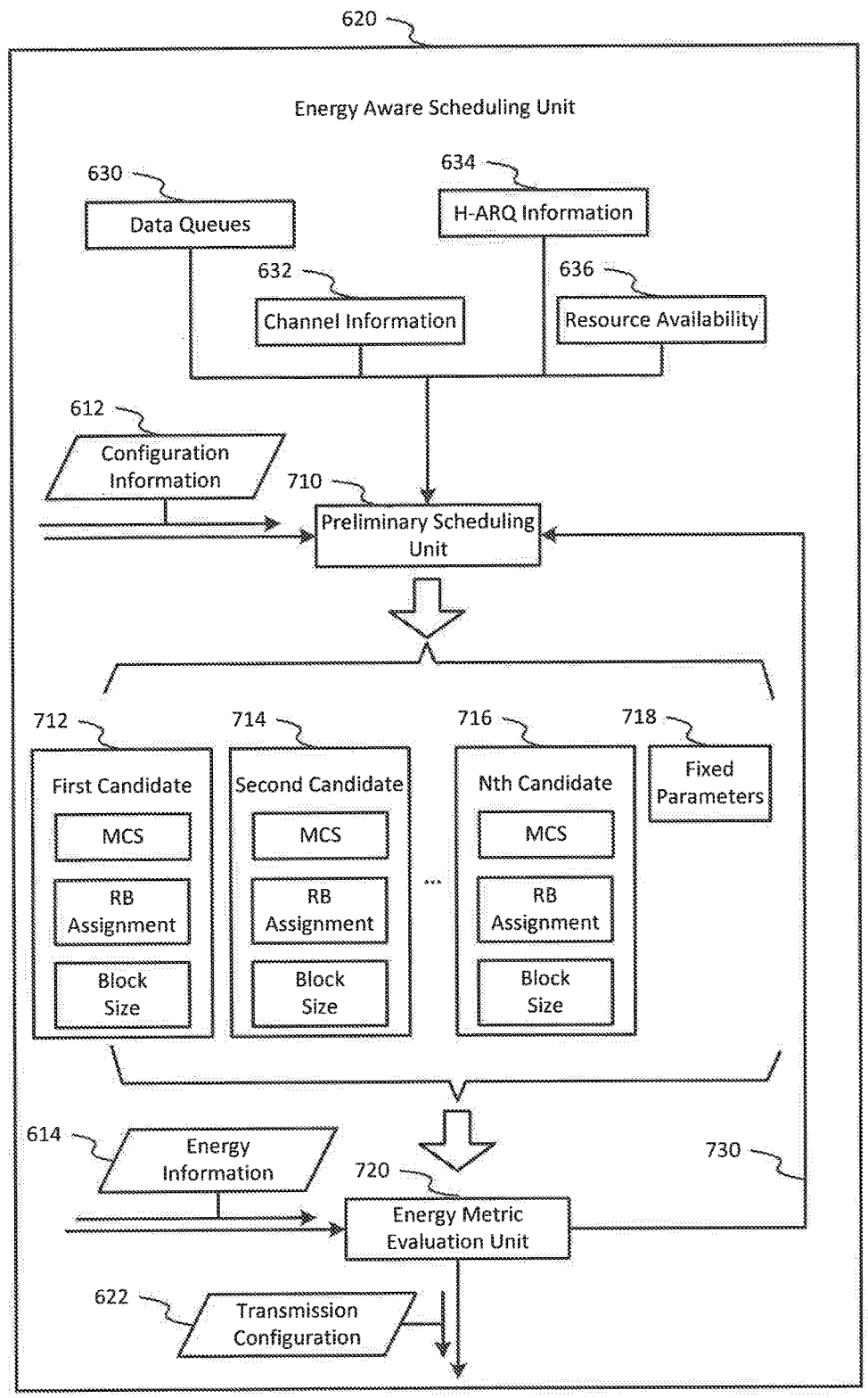
FIG. 7 is a block diagram illustrating an exemplary energy aware scheduling unit, in accordance with various aspects of the present disclosure.

Referring to FIG. 7, a block diagram illustrating an exemplary energy aware scheduling unit, in accordance with various aspects of the present disclosure is shown. In FIG. 7, the energy aware scheduling unit 620 of FIG. 6 is shown, and includes a preliminary scheduling unit 710 and an energy metric evaluation unit 720. As shown in FIG. 7, the preliminary scheduling unit 710 may receive the configuration information 612 (e.g., the one or more semi-dynamic parameters), the data queue information 630, the channel information 632, the HARQ information 634, and the resource availability information 636, and may determine one or more candidate configurations for the transmission. In FIG. 7, the one or more candidate configurations are shown to include a first candidate configuration 712, a second candidate configuration 714, up to an N-th candidate configuration 716, where each candidate configuration is associated with an MCS, a resource block (RB) assignment, and a block size (e.g., a transport block size). It is noted that the candidate configurations may include one or more candidate configurations, and that N candidate configurations are shown for purposes of illustration, rather than by way of limitation. Further, it is noted that while the candidate configurations are described as including information associated with an MCS, a transport block size, and an RB assignment, candidate configurations according to some aspects may include other information that is in addition to, or different from the information associated with the MCS, the transport block size, and/or the RB assignment.

Each of the one or more candidate configurations may be used to optimize the configuration information 612 to determine a transmission configuration providing a lowest energy consumption by the mobile device to decode the transmission while satisfying the fixed parameters and constraints imposed on the transmission. The constraints may include QoS information determined based on the service information 602 of FIG. 6, bandwidth requirements, various functions supported by the mobile device, as indicated by the capability information 608 of FIG. 6, a desired energy level indicated by the energy level information 604 of FIG. 6, and may also be imposed on the transmission by the data queue information 630, the channel information 632, the HARQ information 634, and/or the resource availability information 636. For example, each of the one or more candidate configurations may be associated with transmission of data from one or more of the data queues 630 in accordance with QoS requirements using one or more MCSs supported by the mobile device, and may be associated with a transport block size and an RB assignment consistent with the corresponding MCS (e.g., the transport block size and RB assignment for each of the one or more candidate configurations may be sufficient to include the data and overhead information, such as parity bits and/or zero padding bits, required by the corresponding MCS for the transmission).

In an aspect, the preliminary scheduling unit 710 may identify the one or more candidate configurations based on the channel information 632 and the configuration information 612. For example, the configuration information 612 may indicate a target SINR for the transmission, and the preliminary scheduling unit 710 may identify one or more MCSs that are suitable (e.g., provide a threshold block level error rate (BLER)) for the transmission. In an aspect, the one or more MCSs that are suitable for the transmission in view of the target SINR may be pre-determined (e.g., based on expected BLER information stored in a database accessible to the preliminary scheduling unit 710, or provided with the configuration information 612). In response to identifying the one or more MCSs that are suitable for the transmission, the preliminary scheduling unit 710 may provide the one or more candidate configurations to the energy metric evaluation unit 720 for energy efficiency evaluations, as described below.

In an aspect, the one or more suitable (or available) MCSs may be selected from a pre-determined table. For example, the pre-determined table may indicate a plurality of target SINRs, and, for each target SINR, may identify one or more MCSs that that may be used to configure the transmission while providing the target SINR. The pre-determined table may also include information indicating one or more block sizes and RB assignments for each of the MCSs that provides the target SINR, or other information. In an aspect, the one or more candidate configurations may be identified using the pre-determined table. For example, as explained above, the configuration information 612 may include one or more semi-dynamic parameters (e.g., parameters that are not to be optimized by the energy aware scheduling unit 620), and the pre-determined table may be used to identify one or more dynamic parameters (e.g., one or more parameters that are to be optimized by the energy aware scheduling unit 620), such as a MCS, RB assignment, block size, etc. In an aspect, the pre-determined table may be included with the energy metric information. By using a pre-determined table, the computational complexity and computational resources required to optimize the energy consumption by the mobile device for the transmission may be reduced.

In an aspect, given a set of semi-dynamic parameters, the preliminary scheduling unit 710 may determine whether the semi-dynamic parameters impose constraints on one or more dynamic parameters for configuring the transmission, and may determine the one or more dynamic parameters based on the constraints (if any) imposed by the set of semi-dynamic parameters. In an aspect, the one or more dynamic parameters may correspond to parameters of the transmission that may be optimized to reduce power consumption of the mobile device. After determining the one or more dynamic parameters, the preliminary scheduling unit 710 may generate the one or more candidate configurations. For example, each of the one or more candidate configurations may include at least one dynamic parameter that is configured differently than another candidate configuration (e.g., two candidate configurations may include a same block size, but different MCSs, or may include the same MCS, but different coding rates). In this manner, determining the energy consumption of each of the one or more candidate configurations may result in identification of a candidate configuration that provides a greatest reduction in energy consumption by the mobile device. By determining whether the dynamic parameters are constrained based on the semi-dynamic parameters, which are determined less frequently than the dynamic parameters, the number of parameters that are to be optimized may be reduced, further simplifying the transmission configuration process, and increasing the speed at which transmission optimizations may be determined.

The energy metric evaluation unit 720 may be adapted to evaluate the energy consumed by the mobile device to decode a transmission configured according to each of the one or more candidate configurations. For example, the energy metric evaluation unit 720 may receive the energy information 614, and may determine, for each of the one or more candidate configurations, the energy consumed by the mobile device to decode a transmission configured according to each of the one or more candidate configurations. The energy metric evaluation unit 720 may be adapted to minimize the energy consumption of the mobile device to decode the transmission, and therefore, may select the candidate configuration providing the lowest energy consumption by the mobile device.

In an aspect, the candidate configuration providing the lowest energy consumption may not be the candidate configuration associated with a smallest transport block size. For example, while a first MCS may provide for a smaller transport block size, a decoder of the mobile device used to decode transmissions using the first MCS may be less energy efficient than a second decoder used to decode transmissions associated with a second MCS that provides a larger transport block size. The energy information 614 may include information that allows the energy metric evaluation unit 720 to determine whether a MCS is more energy efficient for the mobile device than another MCS. For example, as explained above, the energy information 614 may include information generated by a manufacturer of the mobile device that may indicate the energy efficiency (e.g., a number of Joules/bit consumed) for the mobile device for all supported MCSs. It is noted that different mobile devices may be more energy efficient with different MCSs. Thus, by determining multiple MCSs for each transmission to each mobile device, the energy metric evaluation unit 720 may be operable to determine, for different mobile devices, a MCS that provides a lowest energy consumption for each of the different mobile devices. Thus, the energy metric evaluation unit 720 may provide a robust solution to optimizing transmissions to mobile devices based on energy consumption and energy metric information.

In an aspect, the energy metric evaluation unit 720 and the preliminary scheduling unit 710 may operate to iteratively determine the configuration of the transmission. For example, in an aspect, the preliminary scheduling unit 710, during a first iteration, may generate a first set of candidate configurations, where each candidate configuration in the first set of candidate configurations is associated with a first MCS (e.g., a convolutional code encoding scheme), and where each of the candidate configurations in the first set of candidate configurations may be associated with a different coding rate (e.g., a 1/2 rate, a 2/3 rate, etc.), a different transport block size, a different RB assignment, or a combination thereof. During the first iteration, the energy metric evaluation unit 720 may identify a candidate configuration from among the first set of candidate configurations that provides a lowest energy consumption by the mobile device.

As indicated by the arrow 730, the candidate configuration may be fed back to the preliminary scheduling unit 710, and the preliminary scheduling unit 710 may determine, during a second iteration, a second set of candidate configurations for the transmission. The second set of candidate configurations may include the candidate configuration identified during the first iteration, and one or more additional candidate configurations, where each of the one or more additional candidate configurations are associated with a different MCS than the candidate configuration identified during the first iteration, and where each of the one or more additional candidate configurations may be associated with a different coding rate, a different transport block size, a different RB assignment, or a combination thereof. During the second iteration, the energy metric evaluation unit 720 may identify a candidate configuration from among the second set of candidate configurations that provides a lowest energy consumption by the mobile device, which may be the candidate configuration identified during the first iteration, or may be one of the one or more additional candidate configurations. The preliminary scheduling unit 710 and the energy metric evaluation unit 720 may continue to iteratively identify the candidate configuration providing the lowest energy consumption by the mobile device, and, upon identifying the candidate configuration providing the lowest energy consumption by the mobile device, may output the candidate configuration as the transmission configuration 622.

It is noted that the iterative process described above is provided for purposes of illustration, rather than by way of limitation, and that other iterative processes may be used to identify the candidate configuration providing the lowest energy consumption by the mobile device. For example, during a first iteration, multiple MCSs may be evaluated to identify an MCS providing the lowest energy consumption by the mobile device, and then the identified MCS may be used as a basis for subsequent iterations where different transport block sizes, RB assignments, coding rates, etc. may be evaluated for energy efficiency to identify the candidate configuration providing the lowest energy consumption by the mobile device.

In an aspect, the energy metric evaluation unit 720 may evaluate each of the candidate configurations by performing a lookup in a lookup table (e.g., when the energy information 614 includes or is arranged as a lookup table). In an aspect, the lookup table may include multiple MCSs for each SINR target, and may include energy metrics associated with multiple configurations (e.g., coding rates, block sizes, RB assignments, etc.) for each of the multiple MCSs. It is noted that in some aspects, the base station may configure the transmission independent of the energy metrics, as explained above with respect to FIG. 4 (e.g., based on QoS requirements, whether energy efficiency gains satisfy a threshold energy efficiency gain, etc.).

By evaluating multiple candidate configurations associated with different MCSs using a lookup table, the computational complexity for identifying the candidate configuration providing the lowest energy consumption by the mobile device may be reduced, which may facilitate determining the candidate configuration providing the lowest energy consumption by the mobile device more frequently, such as once per TTI. Further, by reducing the energy consumption by the mobile device, the mobile device may be operated for longer periods of time before requiring connection to a power source (e.g., to recharge batteries of the mobile device). Thus, the energy aware scheduler 600, as described with reference to FIGS. 6 and 7, may provide for configuring transmissions between a mobile device and a base station to reduce power consumption by a mobile device in accordance with aspects of the present disclosure.

Figure 8:
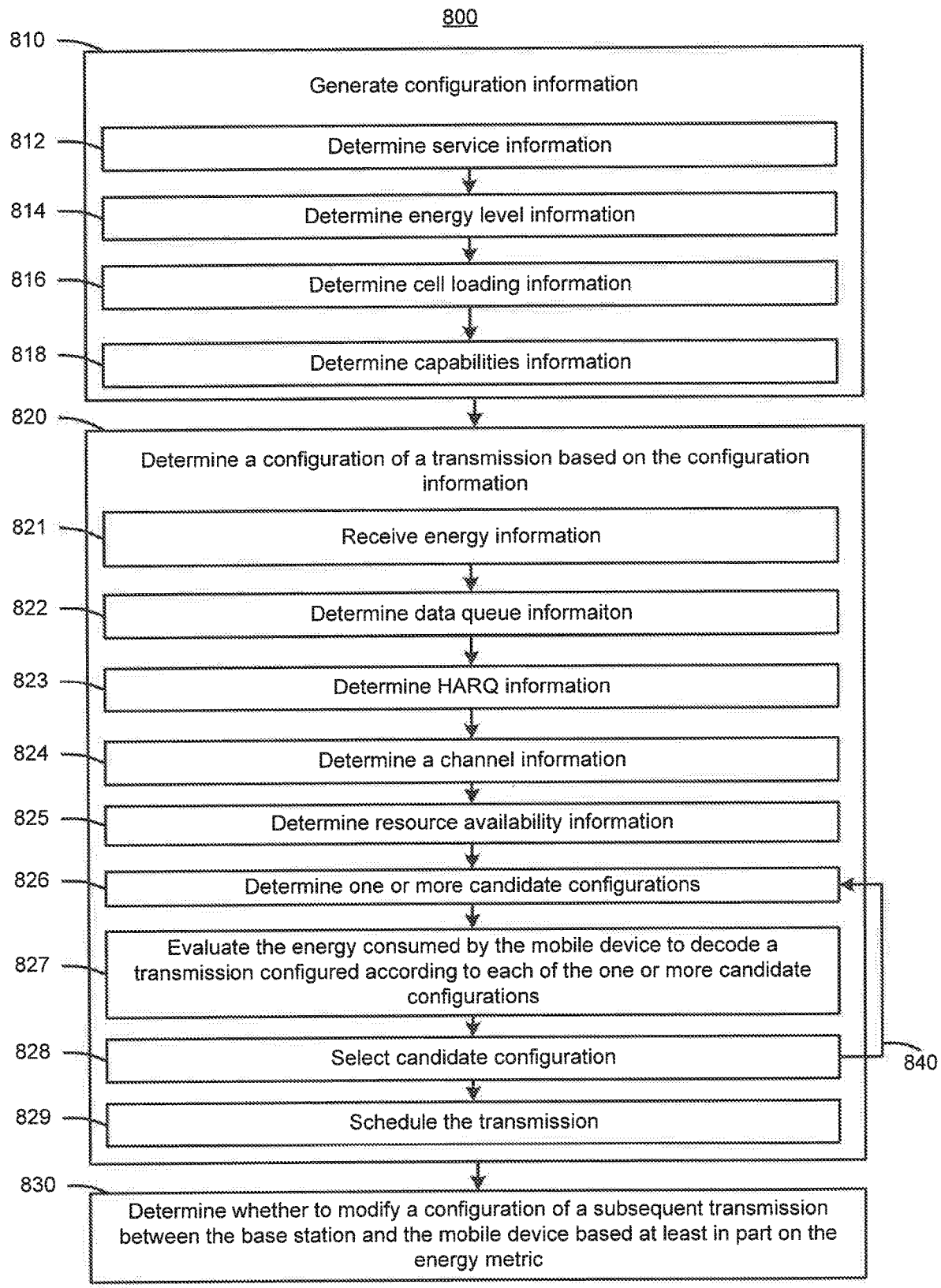
FIG. 8 is a flow diagram of an exemplary method for configuring a transmission to manage power of a mobile device, in accordance with various aspects of the present disclosure.

Referring to FIG. 8, a flow diagram of an exemplary method for configuring a transmission to manage power of a mobile device, in accordance with various aspects of the present disclosure is shown as a method 800. In an aspect, the method 800 may be performed by a scheduler (e.g., the scheduler 422 of FIG. 4 or the energy aware scheduler 600 of FIGS. 6 and 7) of a base station. In an additional or alternative aspect, the method 800 may be stored as instructions that, when executed by a processor, cause the processor to perform operations for determining a configuration of a transmission according to aspects of the present disclosure.

At 810, the method includes generating configuration information. The configuration information may include one or more semi-dynamic parameters that may be used to configure a transmission between a base station (e.g., the base station 410 of FIG. 4) and a mobile device (e.g., the mobile device 440 of FIG. 4) according to aspects of the present disclosure. In an aspect, the configuration information may be the configuration information 612 of FIGS. 6 and 7. In an aspect, the method 800 includes, at 812, determining service information. In an aspect, the service information may correspond to the services 602 of FIG. 6 (e.g., services being provided to or requested by the mobile device, QoS requirements, etc.), and the service information may be used to determine the configuration information. In an additional or alternative aspect, the method 800 includes, at 814, determining energy level information. In an aspect, the energy level information may be the energy level 604 of FIG. 6, and may indicate a target energy level for the mobile device. The energy level information may be used to determine configuration of the transmission, as described with reference to FIG. 6.

At 816, the method 800 includes determining cell loading information. In an aspect, the cell loading information may be the cell loading information 606 of FIG. 6, and may indicate a current loading of a cell serving the mobile device, a current loading of a cell neighboring the cell serving the mobile device, or a combination thereof. In an additional or alternative aspect, the cell loading information may correspond to historical cell loading information of the cell serving the mobile device, historical cell loading information of one or more cells adjacent to the serving cell, or a combination thereof. In yet another additional or alternative aspect, the cell loading information may include current cell loading information (e.g., current cell loading information for the current cell and/or one or more cells adjacent to the serving cell), historical cell loading information (e.g., historical cell loading information for the current cell and/or one or more cells adjacent to the serving cell), heuristic information, or a combination thereof. The cell loading information may be used to configure the transmission and manage the power consumption by the mobile device. For example, based on the cell loading information, an interference management technique (e.g., eICIC, NAIC, etc.) may be selected for the transmission. In an aspect, the interference management technique may be selected to reduce power consumption by the mobile device.

At 818, the method 800 may include determining capabilities information. In an aspect, the capabilities information may be the capabilities information 608 of FIG. 6, and may indicate one or more capabilities of the mobile device. For example, the capabilities information may indicate one or more functions supported by the mobile device, such as network interference management techniques supported by the mobile device, one or more MCSs supported by the mobile device, one or more transmission modes supported by the mobile device, one or more CA schemes supported by the mobile device, one or more duplex modes supported by the mobile device, one or more UE categories, one or more frame structures supported by the mobile device, or a combination thereof. In an aspect, the interference technique determined, at 816, based on the cell loading information may further be determined based on the capabilities information (e.g., based on the one or more interference management techniques supported by the mobile device). Additionally or alternatively, the configuration of the transmission may be determined, based in part, on the capabilities information. For example, one or more MCSs that are supported by the mobile device may be identified as available MCSs (e.g., MCSs that may be used to configure the transmission). As another example, one or more transmission modes supported by the mobile device may be identified as available transmission modes.

The configuration information generated at 810 may include one or more semi-dynamic parameters. In an aspect, the one or more semi-dynamic parameters may be parameters that are not to be optimized by the scheduler (e.g., the scheduler 422 of FIG. 4 and/or the energy aware scheduling unit 620 of FIGS. 6 and 7), as described with reference to FIGS. 6 and 7. For example, the one or more semi-dynamic parameters may include a transmission mode of the mobile device, which may not change during the transmission and may not be optimized by the scheduler. Additionally, the configuration information generated at 810 may identify other parameters that may be optimized by the scheduler, such as selecting an available MCS that provides a greatest reduction in energy consumption by the mobile device for processing the transmission.

At 820, the method 800 includes determining a configuration of the transmission based on the configuration information. The transmission configuration may identify an MCS to be used for the transmission, a transport block size associated with the transmission, and a resource block assignment for the transmission. Additionally, the transmission configuration may indicate a duplex mode for the transmission, a bandwidth allocated for the transmission, a number of component carriers assigned to the transmission (e.g., when CA is used), etc. In an aspect, the scheduler may provide the transmission configuration to a transmit processing chain that is adapted to generate the transmission between the base station and the mobile device in accordance with the transmission configuration, as explained above with reference to FIGS. 6 and 7. In an additional or alternative aspect, the scheduler may generate the transport blocks in accordance with the transmission configuration, and may initiate transmission of the transport blocks to the mobile device. In an aspect, the scheduler may determine transmission configuration information during each transmit time interval (TTI), as explained above with reference to FIGS. 6 and 7.

In an aspect, the configuration of the transmission may be determined to reduce energy consumption by the mobile device during processing of the transmission. In an additional or alternative aspect, the configuration of the transmission may not reduce energy consumption by the mobile device for processing the transmission, such as when an optimized transmission configuration does not reduce the energy consumption by the mobile device beyond a threshold. This may be beneficial when the serving cell is serving a high number of mobile devices, since dynamically optimizing transmission configurations for each mobile device being served may reduce performance of the serving cell. Dynamically configuring the transmissions to reduce energy consumption by mobile devices only when the reduction satisfies the threshold may provide a tradeoff between performance of the serving cell and the power consumption by the mobile devices.

In an aspect, the method 800 includes, at 821, receiving energy information. In an aspect, the energy information may be the energy information 614 of FIGS. 6 and 7. In an additional or alternative aspect, the database may include at least a portion of the energy metrics information 420 of FIG. 4. In an aspect, the energy information may be a database storing information that may be used to determine an amount of energy consumed by the mobile device during the transmission based on various configurations of the transmission. For example, the database may include information indicating an amount of energy consumed by the mobile device per unit of data (e.g., Joules/bit). In an aspect, the database may be a lookup table. In an aspect, the energy information may be specific to the mobile device. For example, the energy information may be filtered from a database such that only energy information associated with the configuration information (e.g., the configuration information generated at 810) is used. Thus, the energy information received at 821 may only include energy information for configurations of the transmission (e.g., the one or more available MCSs, the one or more available CA schemes, the one or more interference management techniques, etc.) identified in the configuration information generated at 810. In an additional or alternative aspect, the energy information may be retrieved a database provided to the base station by the mobile device (e.g., during registration between the base station and the mobile device). In an additional or alternative aspect, the database may be provided to the base station by an operator providing the base station. For example, a manufacturer of the mobile device may provide the database to the operator as part of a certification process (e.g., a process whereby the operator authorizes the use of the mobile device for use on the operator's network(s)). In an aspect, the database may be SKU-based.

For example, information stored in the database may be organized by mobile device SKU, whereby different mobile devices manufactured by one or more manufacturers each have energy information stored in the database. The energy information retrieved at 821 may be used to determine an amount of energy consumed by the mobile device for various configurations of the transmission.

At 822, the method 800 includes determining data queue information. In an aspect, the data queue information may be the data queue information 630 of FIGS. 6 and 7. The data queue information may be used to configure the transmission between the base station and the mobile device. For example, data to be transmitted in connection with each of the one or more services (e.g., the services indicated by the service information determined at 812) may be organized into the data queues (e.g., the data queues 630 of FIGS. 6 and 7) according to a QoS associated with each of the one or more services. During transmission, data stored in a data queue associated with a highest QoS may be processed by the energy aware scheduling unit 620 for transmission before other data associated with a lesser QoS, and so on. The QoS associated with data being scheduled for transmission may affect the MCS selected for the transmission, as well as other transmission configuration parameters, such as block size, resource block allocations, bandwidth requirements, etc. For example, data associated with a first QoS may best be transmitted using a first MCS, and data associated with a second QoS may use the first MCS or another MCS (e.g., another MCS providing a reduced energy consumption by the mobile device). Thus, the scheduler may determine the configuration of the transmission based, at least in part, on the data queue information determined at 822.

At 823, the method 800 includes determining HARQ information. In an aspect, the HARQ information may be the HARQ information 634 of FIGS. 6 and 7, and may indicate a HARQ target (e.g., a probability of success for a first transmission according to a transmission configuration), a maximum number of HARQ retransmissions (e.g., a maximum number of times that the base station is to retransmit information to the mobile device in response to receiving a negative acknowledgement (NACK) or periodically irrespective of receiving a NACK, etc.), and a frequency of HARQ retransmissions (e.g., how often to retransmit information to the mobile device). The energy information received at 821 may include energy consumption information associated with an amount of energy consumed by the mobile device for processing the transmissions and/or the retransmission of the transmissions using HARQ, as described above with reference to FIGS. 4 and 6, and may be used to determine a configuration of a HARQ parameter for the transmission. For example, a scheduler performing the operations of the method 800 may determine the configuration of the transmission based in part on the HARQ information by predicting an energy consumption by the mobile device for processing the transmission and one or more retransmissions according to the HARQ information. In an aspect, the MCS to be used for the transmission may be determined based at least in part on the HARQ information. For example, a first MCS of the one or more available MCSs may require more energy for processing the transmission and/or the retransmissions than a second MCS.

At 824, the method 800 includes determining channel information, where the channel information may indicate a quality of a communication channel between the base station and the mobile device. In an aspect, the channel information may be the channel information 632 of FIGS. 6 and 7. The channel information may be used to determine the configuration of the transmission. For example, when the channel information indicates poor channel conditions, an MCS providing improved performance in poor channel conditions may be selected for the transmission. However, such an MCS may require a larger resource block size (e.g., due to zero padding and/or parity bit requirements), which may increase the amount of energy consumed by the mobile device to decode the transmission. In an aspect, the channel information may include information indicating an SINR, and the configuration of the transmission may be determined based, at least in part, on the SINR. In an additional or alternative aspect, the channel information may include information associated with channel quality index (CQI) information, rank indication (RI) information, precoding matrix indicator (PMI) information, Doppler spread estimate information, or a combination thereof received from the mobile device, and may be used to determine the configuration of the transmission.

As another example of determining the configuration of the transmission based on the channel quality information, when the channel quality information indicates poor channel conditions, the scheduler may determine that one or more retransmissions may occur, and may estimate an amount of energy consumed by the mobile device for processing retransmissions based on the HARQ information. Additionally, the MCS for the transmission may be selected based on whether one of the available MCSs is predicted to require fewer retransmissions based on the HARQ information than other available MCSs. For example, decoding a transmission configured based on an MCS including additional parity bits may consume more power than other available MCSs including less parity bits, but may require fewer retransmissions to be successfully received by the mobile device. The scheduler may select the MCS including the additional parity bits when the increased power consumption by the mobile device for decoding the additional parity bits is less than an amount of power required to decode the transmission and the retransmissions using the other available MCSs.

At 825, the method 800 includes determining resource availability information. The resource availability information may indicate one or more resources that are available for providing the transmission between the base station and the mobile device. For example, the resource availability information may identify a number of component carriers that may be assigned to the transmission, a bandwidth that may be used to provide the transmission, other availability of other resources, or a combination thereof, that may be allocated to the transmission. It is noted that the number of available component carriers may be more than a maximum number of component carriers that the mobile device may support for CA purposes, and the number of component carriers assigned to the transmission may be less than or up to the maximum number of available component carriers supported by the mobile device for CA, where the number of component carriers assigned to the transmission may be determined based on the energy information (e.g., energy information 614 or the energy metrics information 420 of FIG. 4). Further, it is noted that available bandwidth may exceed a maximum allowable bandwidth for the mobile device (e.g., as set by the operator of the base station according to a service contract associated with the mobile device), or may be less than a minimum required bandwidth (e.g., a bandwidth providing a minimum QoS for a service) associated with the mobile device. In an aspect, the resource availability information may be the resource availability information 636 of FIG. 6.

At 826, the method 800 includes determining one or more candidate configurations for the transmission. Each of the one or more candidate configurations may be used to optimize the configuration information to determine a transmission configuration providing a lowest energy consumption by the mobile device to decode the transmission while satisfying fixed parameters and constraints imposed on the transmission. The constraints may include quality of service information determined based on the service information, bandwidth requirements, capabilities of the mobile device indicated by the capability information, the desired or target energy level indicated by the energy level information, etc. Constraints may also be imposed on the transmission by the data queue information, the channel information, the HARQ information, and/or the resource availability information. For example, each of the one or more candidate configurations may be associated with transmission of data from one or more of the data queues in accordance with QoS requirements using one or more MCSs supported by the mobile device, and may be associated with a transport block size and an RB assignment consistent with the corresponding MCS (e.g., the transport block size and RB assignment for each of the one or more candidate configurations may be sufficient to include the data and overhead information, such as parity bits and/or zero padding bits, required by the corresponding MCS for the transmission).

In an aspect, the scheduler may identify the one or more candidate configurations based on the channel information and the configuration information. For example, the configuration information may indicate a target SINR for the transmission, and the scheduler may identify one or more MCSs that are suitable (e.g., provide a threshold block level error rate (BLER)) for the transmission. In an aspect, the one or more MCSs that are suitable for the transmission in view of the target SINR may be pre-determined (e.g., based on expected BLER information stored in a database accessible to the scheduler, or provided with the configuration information). In an aspect, the one or more suitable (or available) MCSs may be selected from a pre-determined table. For example, the pre-determined table may indicate a plurality of target SINRs, and, for each target SINR, may identify one or more MCSs that that may be used to configure the transmission while providing the target SINR. The pre-determined table may also include information indicating one or more block sizes and RB assignments for each of the MCSs that provides the target SINR, or other information.

In an aspect, the one or more candidate configurations may be identified using the pre-determined table. For example, the configuration information may include one or more semi-dynamic parameters (e.g., parameters that are not to be optimized by the energy aware scheduling unit 620), and the pre-determined table may be used to identify one or more dynamic parameters (e.g., one or more parameters that are to be optimized by the scheduler), such as an MCS, an RB assignment, a block size, etc. In an aspect, the pre-determined table may be included with the energy information. By using a pre-determined table, the computational complexity and computational resources required to optimize the energy consumption by the mobile device for the transmission may be reduced.

In an aspect, given a set of semi-dynamic parameters, the scheduler may determine whether the semi-dynamic parameters impose constraints on one or more dynamic parameters for configuring the transmission, and may determine the one or more dynamic parameters based on the constraints (if any) imposed by the set of semi-dynamic parameters.

In an aspect, the one or more dynamic parameters may correspond to parameters of the transmission that may be optimized to reduce power consumption of the mobile device.

After determining the one or more dynamic parameters, the scheduler may generate the one or more candidate configurations. For example, each of the one or more candidate configurations may include at least one dynamic parameter that is configured differently than another candidate configuration (e.g., two candidate configurations may include a same block size, but different MCSs, or may include the same MCS, but different coding rates). In this manner, determining the energy consumption of each of the one or more candidate configurations may result in identification of a candidate configuration that provides a greatest reduction in energy consumption by the mobile device. By determining whether the dynamic parameters are constrained based on the semi-dynamic parameters (which are determined less frequently than the dynamic parameters), the number of parameters that are to be optimized may be reduced, further simplifying the transmission configuration process, and increasing the speed at which transmission optimizations may be determined.

At 827, the method 800 includes evaluating the energy consumed by the mobile device to decode a transmission configured according to each of the one or more candidate configurations. For example, the scheduler may receive the energy information, at 821, and may determine, for each of the one or more candidate configurations, the energy consumed by the mobile device to decode a transmission configured according to each of the one or more candidate configurations. The method 800 may enable a scheduler to minimize the energy consumption of the mobile device to decode the transmission. At 828, the method 800 includes selecting the candidate configuration providing the lowest energy consumption by the mobile device, and, at 829, scheduling the transmission in accordance with the selected candidate configuration providing the lowest energy consumption by the mobile device.

In an aspect, the candidate configuration providing the lowest energy consumption may not be the candidate configuration associated with a smallest transport block size. For example, while a first MCS may provide for a smaller transport block size, a decoder of the mobile device used to decode transmissions using the first MCS may be less energy efficient than a second decoder used to decode transmissions associated with a second MCS that provides a larger transport block size. The energy information may include information that allows the scheduler to determine whether an MCS is more energy efficient for the mobile device than another MCS. For example, as explained above, the energy information may include information generated by a manufacturer of the mobile device that may indicate the energy efficiency (e.g., a number of Joules/bit consumed) for the mobile device for all supported MCSs. It is noted that different mobile devices may be more energy efficient with different MCSs. Thus, by determining multiple MCSs for each transmission to each mobile device, the method 800 may determine, for different mobile devices, an MCS that provides a lowest energy consumption for each of the different mobile devices. Thus, the method 800 may provide a robust solution to optimizing transmissions to mobile devices based on energy consumption and energy metric information.

In an aspect, the method 800 may iteratively determine the configuration of the transmission, as indicated by the arrow 840. For example, during a first iteration, a first set of candidate configurations may be generated, at 826, where each candidate configuration in the first set of candidate configurations is associated with a first MCS (e.g., a convolutional code encoding scheme), and where each of the candidate configurations in the first set of candidate configurations may be associated with a different coding rate (e.g., a 1/2 rate, a 2/3 rate, etc.), a different transport block size, a different RB assignment, or a combination thereof. At 827, each candidate configuration of the first set of candidate configurations may be evaluated to determine the energy consumed by the mobile device, and, at 828, a candidate configuration from among the first set of candidate configurations that provides a lowest energy consumption by the mobile device may be selected.

As indicated by the arrow 840, a second set of candidate configurations for the transmission may be determined. The second set of candidate configurations may include the candidate configuration selected at 828 during the first iteration, and one or more additional candidate configurations, where each of the one or more additional candidate configurations are associated with a different MCS than the selected candidate configuration, and where each of the one or more additional candidate configurations may be associated with a different coding rate, a different transport block size, a different RB assignment, or a combination thereof. At 827, each candidate configuration of the second set of candidate configurations may be evaluated to determine the energy consumed by the mobile device, and, at 828, a candidate configuration that provides lowest energy consumption by the mobile device may be selected from among the second set of candidate configurations. The candidate configuration selected during the second iteration may be the candidate configuration selected during the first iteration, or may be one of the one or more additional candidate configurations. The method 800 may continue to iteratively generate candidate configurations and select a candidate configuration providing the lowest energy consumption by the mobile device, and, upon identifying the candidate configuration providing the lowest energy consumption by the mobile device, may schedule the transmission, at 829, based on the final selected candidate configuration.

It is noted that the iterative process described above is provided for purposes of illustration, rather than by way of limitation, and that other iterative processes may be used to identify the candidate configuration providing the lowest energy consumption by the mobile device. For example, during a first iteration, multiple MCSs may be evaluated to identify an MCS providing the lowest energy consumption by the mobile device, and then the identified MCS may be used as a basis for subsequent iterations where different transport block sizes, RB assignments, etc. may be evaluated for energy efficiency to identify the candidate configuration providing the lowest energy consumption by the mobile device.

At 830, the method 800 includes determining whether to modify a configuration of a subsequent transmission between the base station and the mobile device based at least in part on the energy information. In an aspect, determining whether to modify a configuration of the subsequent transmission may include determining whether any of the information used to determine the previous transmission configuration has changed, such as the available resources, the target SINR, the cell loading information, the data queue information, the services information, etc. If none of the information used to determine the previous transmission configuration has changed, the method 800 may schedule the subsequent transmission using the previously determined transmission configuration. If at least a portion of the information has changed, the method 800 may be repeated in all or in part (only the part associated with the information that has changed) to determine the configuration of the subsequent transmission in order to manage power consumption of the mobile device.

The method 800 may improve the performance of mobile devices. For example, by configuring transmissions to reduce the power consumption by the mobile devices for processing transmissions, the mobile devices may be operated for longer periods of time without being connected to a power source. In an aspect, the method 800 may also provide a tradeoff between the increased processing by base stations to configure transmissions to reduce power consumption for mobile devices, and overall network performance. For example, as explained above, in some aspects, the method 800 may only dynamically configure transmissions when such configurations provide a threshold reduction in power consumption by the mobile devices. Thus, when the configuration does not provide the threshold reduction in power consumption, the base station may not continue to use processing resources to configure transmissions, which may allow the base station to process transmissions for other mobile devices more quickly.

In an aspect, an apparatus for managing a power consumption of a mobile device (e.g., the mobile device 440 of FIG. 4), in accordance with various aspects of the present disclosure is disclosed and includes means for identifying an energy metric associated with the mobile device. The energy metric may be identified based on information received from the mobile device, information stored at a database (e.g., the database 418 of FIG. 4 or the database 448 of FIG. 4), or other information (e.g., available network resources, etc.), as described with reference to FIG. 4. The means for identifying the energy metric may be the processor 412 of FIG. 4, the scheduler 422 of FIG. 4, the scheduler 344 of FIG. 3, the controller/processor 340 of FIG. 3, the transmit processor 320 of FIG. 3, the transmit MIMO processor 330 of FIG. 3, or the energy aware scheduler 600 of FIGS. 6 and 7. The means for identifying the energy metric may identify the energy metric using iterative process to maximize a reduction in energy consumption by the mobile device, where the iterative process estimates a total energy reduction in energy consumption by the mobile device for different combinations of energy metrics.

The apparatus includes means for configuring a transmission between the base station and the mobile device based at least in part on the energy metric. The means for configuring the transmission may be the processor 412 of FIG. 4, the scheduler 422 of FIG. 4, the scheduler 344 of FIG. 3, the controller/processor 340 of FIG. 3, the transmit processor 320 of FIG. 3, the transmit MIMO processor 330 of FIG. 3, or the energy aware scheduler 600 of FIGS. 6 and 7. Additionally, the means for configuring may include means for determining a first energy consumption for the transmission between the base station and the mobile device based at least in part on the energy metric, and means determining a second energy consumption for a transmission between the base station and the mobile device independent of the energy metric. The means for determining the first energy consumption and the second energy consumption may be the processor 412 of FIG. 4, the scheduler 422 of FIG. 4, the scheduler 344 of FIG. 3, the controller/processor 340 of FIG. 3, the transmit processor 320 of FIG. 3, the transmit MIMO processor 330 of FIG. 3, or the energy aware scheduler 600 of FIGS. 6 and 7.

Further, the means for configuring the transmission may include means for determining a difference between the first energy consumption and the second energy consumption, means configuring the transmission between the base station and the mobile device based at least in part on the energy metric when the difference between the first energy consumption and the second energy consumption satisfies a threshold, and means for configuring the transmission between the base station and the mobile device independent of the energy metric when the difference between the first energy consumption and the second energy consumption does not satisfy a threshold. The means for determining the difference between the first energy consumption and the second energy consumption, the means for configuring the transmission based at least in part on the energy metric, and the means for configuring the transmission independent of the energy metric may be the processor 412 of FIG. 4, the scheduler 422 of FIG. 4, the scheduler 344 of FIG. 3, the controller/processor 340 of FIG. 3, the transmit processor 320 of FIG. 3, the transmit MIMO processor 330 of FIG. 3, or the energy aware scheduler 600 of FIGS. 6 and 7.

Additionally, the apparatus may include means for determining whether to modify a configuration of a subsequent transmission between the base station and the mobile device based at least in part on the energy metric. The means for determining whether to modify the configuration of the subsequent transmission may be the processor 412 of FIG. 4, the scheduler 422 of FIG. 4, the scheduler 344 of FIG. 3, the controller/processor 340 of FIG. 3, the transmit processor 320 of FIG. 3, the transmit MIMO processor 330 of FIG. 3, or the energy aware scheduler 600 of FIGS. 6 and 7.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of operation for a communication device, the method comprising:
receiving signaling associated with a wireless transmission, by the communication device, over a channel transmitted via a communication network, wherein the signaling is based on a transmission configuration for the wireless transmission, the transmission configuration is based on an energy metric associated with the communication device communicating with another wireless communication device, and the wireless transmission occurs between the another wireless communication device and the communication device; and
adjusting operation to at least one of transmit of or receipt of the wireless transmission, by the communication device in response to the signaling, based at least in part on a modulation and coding scheme (MCS) identified by the signaling that is associated with the energy metric.

2. A communication device configured to participate in wireless communications with at least one other wireless communication device, the communication device comprising:
at least one processor configured to:
determine an energy metric associated with a user equipment device or a remote wireless device for wireless communications, wherein the energy metric indicates at least one of energy consumption information for one or more wireless communication transmissions and one or more parameters associated with one or more wireless communication transmissions involving the user equipment device or the remote wireless device and the mobile device; and
identify one or more modulation and coding schemes configured for wireless communications associated with the identified energy metric;
a transceiver configured to communicate wireless signals comprising the one or more identified modulation and coding schemes to at least one of the user equipment communication device and the remote wireless device configured to indicate to the user equipment device to adapt communications based on the identified energy metric.

3. The communication device of claim 2, wherein the transceiver is configured to transmit signaling to the user equipment device or remote wireless device wherein the signaling comprises information configured to instruct the user equipment device or remote wireless device to communicate according to the one or more identified modulation and coding schemes.

4. The communication device of claim 3, wherein signaling is configured for transmission during a connected state.

5. The communication device of claim 2, wherein the communication device is a base station, a network node, or resides in a base station and wherein the communication device communicates with the user equipment device or the remote wireless device via the one or more identified modulation and coding schemes.

6. The communication device of claim 2, wherein the processor is further configured to identify one or more capabilities of the user equipment device or the remote wireless device associated with wireless communications, and wherein the processor is configured to identify the one or more modulation and coding schemes based, at least in part, on the identified capability.

7. The communication device of claim 2, further comprising receiving a message from the user equipment device or the remote wireless device that indicates one or more capabilities associated with the user equipment device or the remote wireless device.

8. The communication device of claim 2, wherein the energy metric is associated with one or more services provided by the mobile device.

9. A mobile device configured to participate in wireless communications with at least one other wireless communication device in a network, the communication device comprising:
a processor coupled to a transceiver, wherein the processor and transceiver are collectively configured to cause the mobile device to:
determine an energy consumption metric associated with a wireless transmission that indicates energy consumption by the mobile device for the wireless transmission;
select one or more modulation and coding schemes for use in wireless communications associated with or based on at least one of the energy consumption metric and signaling received from the at least one other wireless communication device; and transmit parameter information associated with a selected one or more modulation and coding schemes to the at least one other wireless communication device such that parameter information is configured to indicate to the wireless communication device to utilize the selected one or more modulation and coding schemes for wireless communications.

10. The device of claim 9, wherein the processor and transceiver are further configured to cause the mobile device to vary power consumption of the mobile device associated with wireless transmissions based at least on the energy consumption metric.

11. The device of claim 9, wherein the processor and transceiver are further configured to cause the mobile device to transmit the parameter information in a radio resource control (RRC) connected state.

12. The device of claim 9, wherein the processor and transceiver are further configured to cause the mobile device to adjust power consumption of a modem associated with the mobile device such that power consumption of the mobile device varies based at least on the wireless transmission.

13. A communication device configured for wireless communications in a network with one or more other wireless communication devices, the communication device comprising:

a communication interface configured to transmit signals associated with energy consumption metric data associated with transmitting wireless signals and that is configured to indicate energy consumption of the communication device for wireless data transmission;

a processor configured to receive information from a network node indicating one or more modulation and coding schemes for configuring next wireless signal transmissions between the communication device and the network node; and wherein the communication interface is further configured to communicate with the network node via wireless signaling based at least partially on the received information associated with one or more modulation and coding schemes and/or supported functions such that the communications of the next wireless signal transmissions consume energy based at least on the one or more modulation and coding schemes and/or supported functions.

14. The communication device of claim 13, wherein the communication interface is configured to communicate signaling regarding supported functions upon initiating or modifying a radio resource control connection.

15. The communication device of claim 13, further comprising transmitting signaling regarding functions supported by the communication device in response to a query received from the network node.

16. The communication device of claim 15, further comprising receiving signaling from the network node to operate in a power management mode.

17. The communication device of claim 13, further comprising transmitting a request to the network node to operate or a notice of intended operation in a power management mode based at least in part on a usage pattern associated with the communication device.

* * * * *